US012776793B2

(12) United States Patent
Heo et al.

(10) Patent No.: US 12,776,793 B2
(45) Date of Patent: Oct. 27, 2026

(54) METHOD FOR CONTROLLING APERTURE SWITCH IN ENDC AND ELECTRONIC DEVICE SUPPORTING SAME

(71) Applicant: Samsung Electronics Co., Ltd., Suwon-si (KR)

(72) Inventors: Wonhyung Heo, Suwon-si (KR); Minjae Kim, Suwon-si (KR); Jaehyeok Shin, Suwon-si (KR); Kyungrok Lee, Suwon-si (KR); Woosik Cho, Suwon-si (KR); Jaemoon Cha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 817 days.

(21) Appl. No.: 17/966,346

(22) Filed: Oct. 14, 2022

(65) Prior Publication Data

US 2023/0032872 A1 Feb. 2, 2023

Related U.S. Application Data

(63) Continuation of application No. PCT/KR2021/004186, filed on Apr. 5, 2021.

(30) Foreign Application Priority Data

Apr. 17, 2020 (KR) ........................ 10-2020-0046841

(51) Int. Cl.
*H04B 1/00* (2006.01)
*H04B 1/50* (2006.01)

(52) U.S. Cl.
CPC ............. *H04B 1/0064* (2013.01); *H04B 1/50* (2013.01)

(58) Field of Classification Search
CPC .......... H04B 1/0064; H04B 1/50; H04B 1/00; H04B 1/04; H04B 1/18; H04B 1/40; H04B 1/0458; H04W 76/15
See application file for complete search history.

(56) References Cited

U.S. PATENT DOCUMENTS 9,461,673 B2 10/2016 Hassan et al.
9,819,991 B1 11/2017 Rajagopalan et al.
(Continued)

FOREIGN PATENT DOCUMENTS

KR 10-2012-0070347 A 6/2012
KR 10-2016-0110972 A 9/2016
(Continued)

OTHER PUBLICATIONS

Korean Office Action dated Jul. 18, 2024, issued in Korean Application No. 10-2020-0046841.

*Primary Examiner* — Jinsong Hu
*Assistant Examiner* — Rui M Hu
(74) *Attorney, Agent, or Firm* — Jefferson IP Law, LLP

(57) ABSTRACT

An electronic device is provided. The electronic device includes at least one processor configured to support first network communication and second network communication, multiple antennas comprising a first antenna and a second antenna, an aperture switch connected to the first antenna or the second antenna and configured to change resonance characteristics of at least one of the first antenna and the second antenna, and a memory configured to store multiple antenna configurations for controlling a switching operation of the aperture switch. The at least one processor may be configured to identify whether the electronic device is in a state of connection to a first base station which corresponds to the first network communication, and which operates as a master node, and to a second base station which corresponds to the second network communication, and which operates as a secondary node, and identify information regarding allocation of a resource for communication.

20 Claims, 11 Drawing Sheets

(56) References Cited

U.S. PATENT DOCUMENTS

| | | | | |
|---|---|---|---|---|
| 9,831,719 | B2 | 11/2017 | Lee et al. | |
| 9,979,531 | B2 * | 5/2018 | Schwent | H04L 5/02 |
| 2010/0318871 | A1 * | 12/2010 | Lee | H04L 5/0037 714/E11.113 |
| 2012/0157029 | A1 | 6/2012 | Matsuura | |
| 2013/0154897 | A1 * | 6/2013 | Sorensen | H04B 1/40 343/861 |
| 2013/0303235 | A1 * | 11/2013 | Zheng | H04B 15/00 455/552.1 |
| 2014/0073339 | A1 * | 3/2014 | Yang | H04W 72/542 455/452.1 |
| 2015/0118973 | A1 * | 4/2015 | Montgomery | G01C 21/20 455/75 |
| 2015/0201383 | A1 | 7/2015 | Papasakellariou et al. | |
| 2015/0305035 | A1 * | 10/2015 | Hu | H04B 1/0458 370/329 |
| 2015/0372656 | A1 * | 12/2015 | Mow | H03H 7/38 455/77 |
| 2017/0244818 | A1 * | 8/2017 | Kim | H01Q 1/243 |
| 2018/0204101 | A1 * | 7/2018 | De Jongh | H03B 19/05 |
| 2018/0277929 | A1 * | 9/2018 | Seo | H01Q 1/241 |
| 2019/0124716 | A1 | 4/2019 | Hapsari et al. | |
| 2019/0296789 | A1 * | 9/2019 | Yu | H04B 1/401 |
| 2019/0306763 | A1 | 10/2019 | Humbert et al. | |
| 2019/0349821 | A1 | 11/2019 | Kim | |
| 2020/0021317 | A1 | 1/2020 | Kim et al. | |
| 2020/0045761 | A1 * | 2/2020 | Zeng | H04B 7/2643 |
| 2020/0106467 | A1 * | 4/2020 | Filipovic | H04B 1/1638 |
| 2021/0105812 | A1 * | 4/2021 | Rastegardoost | H04L 1/08 |
| 2021/0126619 | A1 * | 4/2021 | Wang | H03H 9/6483 |
| 2021/0136601 | A1 * | 5/2021 | Winslow | G06N 20/00 |
| 2021/0234561 | A1 * | 7/2021 | De Jongh | H04B 1/0458 |
| 2021/0320396 | A1 * | 10/2021 | Kim | H01Q 9/0421 |
| 2021/0351801 | A1 * | 11/2021 | Kani | H03H 7/38 |
| 2022/0052436 | A1 * | 2/2022 | Yang | H04B 1/401 |
| 2022/0286980 | A1 * | 9/2022 | Lee | H04B 1/3838 |
| 2023/0110141 | A1 * | 4/2023 | Ramasamy | H01Q 1/245 370/252 |

FOREIGN PATENT DOCUMENTS

| | | | |
|---|---|---|---|
| KR | 10-2018-0092226 | A | 8/2018 |
| KR | 10-2018-0108493 | A | 10/2018 |

* cited by examiner

800

| Frequency band \ Channel | Low channel | Mid channel | High channel |
|---|---|---|---|
| B2 | A (811) | B (812) | C (813) |
| N41 | D (814) | E (815) | F (816) |
| B2 + N41 | G (817) | H (818) | I (819) |

FIG. 8

METHOD FOR CONTROLLING APERTURE SWITCH IN ENDC AND ELECTRONIC DEVICE SUPPORTING SAME

CROSS-REFERENCE TO RELATED APPLICATION(S)

This application is a continuation application, claiming priority under § 365(c), of an International application No. PCT/KR2021/004186, filed on Apr. 5, 2021, which is based on and claims the benefit of a Korean patent application number 10-2020-0046841, filed on Apr. 17, 2020, in the Korean Intellectual Property Office, the disclosure of which is incorporated by reference herein in its entirety.

BACKGROUND

1. Field

The disclosure relates to a method for controlling an aperture switch in evolved universal terrestrial radio access (E-UTRA) new radio dual connectivity (ENDC) and an electronic device for supporting the same.

2. Description of Related Art

To implement 5th generation (5G) communication, stand-alone (SA) and non-stand alone (NSA) schemes are taken into consideration. The NSA scheme uses new radio (NR) systems together with legacy long-term evolution (LTE) systems. In the NSA scheme, user equipment (UE) may use not only evolved node Bs (eNBs) of the LTE system but also next generation Node B (gNodeBs, gNBs) or secondary gNodeBs (SgNBs) of the NR system. Technology allowing an electronic device to use heterogeneous communication systems may be termed dual connectivity.

Dual connectivity has been first proposed in third generation partnership project (3GPP) release-12 where the 3.5 GHz frequency band other than that for LTE system is used for small cells. The 5G NSA scheme is implemented in a manner of using the LTE system as the master node and the NR system as the secondary node. In the 5G NSA scheme, dual connectivity through the LTE base station and the NR base station may be named E-UTRA new radio dual connectivity (ENDC).

The above information is presented as background information only to assist with an understanding of the disclosure. No determination has been made, and no assertion is made, as to whether any of the above might be applicable as prior art with regard to the disclosure.

SUMMARY

The electronic device needs to impedance-match one or more antennas using all of two network communications in dual connectivity (e.g., evolved universal terrestrial radio access (E-UTRA) new radio dual connectivity (ENDC)) state.

Further, the ENDC-supporting electronic device performs the operation of impedance-matching antennas based on the channel of one of two network communications. For example, when the electronic device includes an aperture tuning circuit without an impedance tuning circuit, the electronic device controls the switching operation of the aperture tuning circuit to impedance-match the antennas based on the channel of the network communication (e.g., long term evolution (LTE)) which serves as the anchor of the two network communications. However, even when the electronic device transmits communication signals using the channel of the other network communication (e.g., new radio (NR)) than the network communication serving as the anchor of the two network communications, the electronic device controls the switching operation of the aperture tuning circuit based on the channel of the network communication serving as the anchor, deteriorating antenna performance.

Aspects of the disclosure are to address at least the above-mentioned problems and/or disadvantages and to provide at least the advantages described below. Accordingly, an aspect of the disclosure is to provide a method for controlling an aperture switch in ENDC and an electronic device supporting the same, which may control the switching operation of the aperture switch to impedance-match antennas in various states (or situations) of the electronic device related to two network communications in ENDC.

Additional aspects will be set forth in part in the description which follows and, in part, will be apparent from the description, or may be learned by practice of the presented embodiments.

In accordance with an aspect of the disclosure, an electronic device is provided. The electronic device includes at least one processor configured to support first network communication and second network communication, a plurality of antennas including a first antenna and a second antenna, an aperture switch connected to the first antenna or the second antenna to change a resonance characteristic of at least one of the first antenna or the second antenna, and a memory configured to store a plurality of antenna settings to control a switching operation of the aperture switch. The at least one processor may be configured to identify whether the electronic device is in a state connected to a first base station corresponding to the first network communication and operated as a master node and a second base station corresponding to the second network communication and operated as a secondary node, upon identifying that the electronic device is in the state, identify information about allocation of a resource for a communication signal using a first frequency band of the second network communication, and control the switching operation of the aperture switch based on an antenna setting corresponding to the first frequency band among the plurality of antenna settings.

In accordance with another aspect of the disclosure, a method for controlling an aperture switch in E-UTRA new radio dual connectivity (ENDC) by an electronic device is provided. The method includes identifying whether the electronic device is in a state connected to a first base station corresponding to first network communication and operated as a master node and a second base station corresponding to second network communication and operated as a secondary node, upon identifying that the electronic device is in the state, identifying information about allocation of a resource for a communication signal to be transmitted using a first frequency band of the second network communication, and upon identifying the information about allocation of the resource for the communication signal, controlling an switching operation of the aperture switch included in the electronic device based on an antenna setting corresponding to a channel of the first frequency band among a plurality of antenna settings stored in a memory of the electronic device.

In accordance with another aspect of the disclosure, an electronic device is provided. The electronic device includes at least one processor configured to support first network communication and second network communication, a plurality of antennas including a first antenna and a second antenna, an aperture switch connected to the first antenna or the second antenna to change at least one resonance characteristic of the first antenna or the second antenna, and a memory storing a plurality of antenna settings to control a switching operation of the aperture switch. The at least one processor may be configured to identify whether the electronic device is in a state connected to a first base station corresponding to the first network communication and operated as a master node and a second base station corresponding to the second network communication and operated as a secondary node, and upon identifying that the electronic device is in the state, control the switching operation of the aperture switch based on an antenna setting corresponding to a channel of a first frequency band of the second network communication among the plurality of antenna settings.

According to various embodiments of the disclosure, the method for controlling an aperture switch in ENDC and the electronic device for supporting the same may control the switching operation of the aperture switch to impedance-match antennas in various states (or situations) of the electronic device related to two network communications in ENDC.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 8 is a view illustrating a table including some of a plurality of antenna settings according to an embodiment of the disclosure;

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
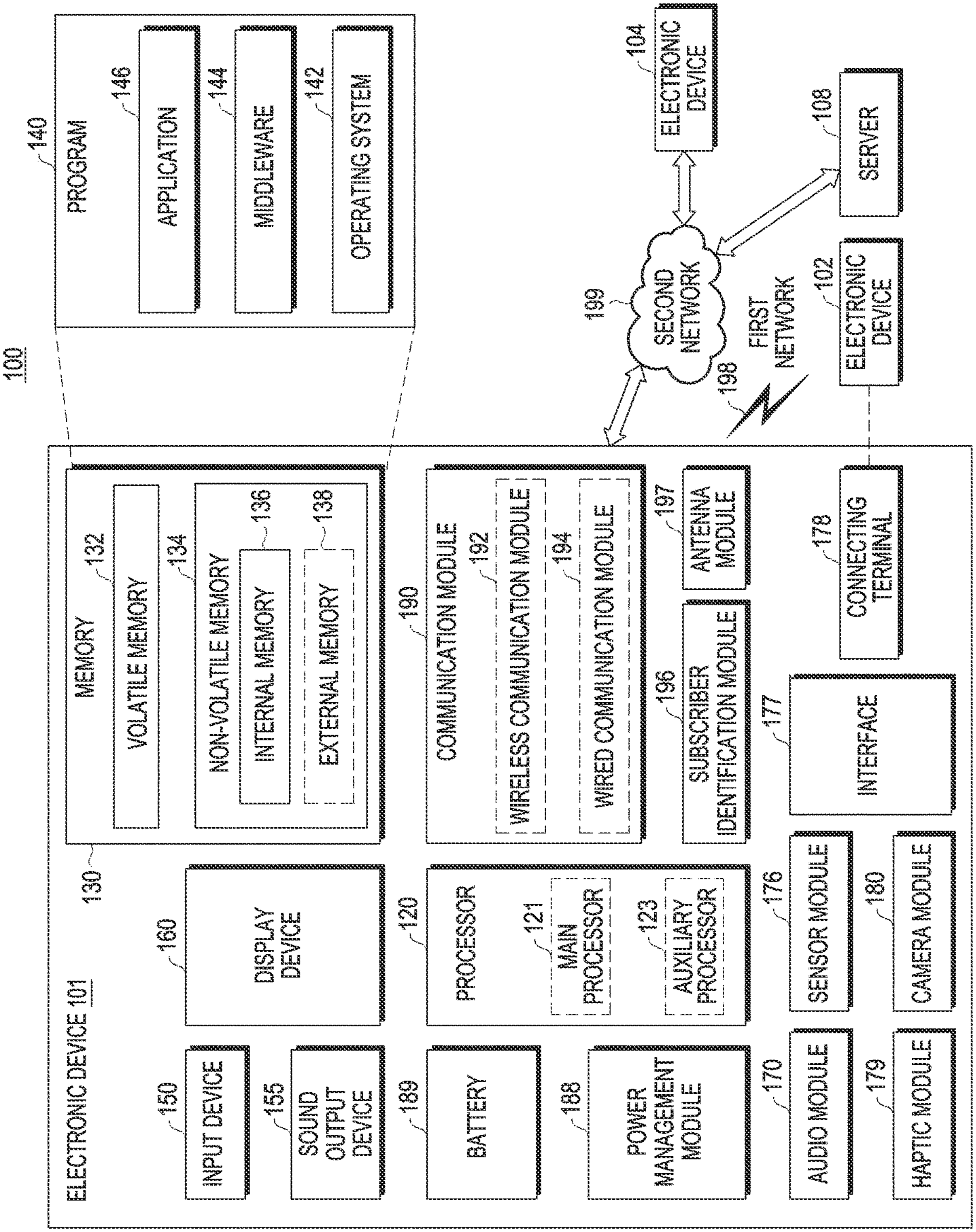
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory 134 may include internal memory 136 and/or external memory 138.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the displays, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or motion) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 388 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™ wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device). According to an embodiment, the antenna module may include one antenna including a radiator formed of a conductor or conductive pattern formed on a substrate (e.g., a printed circuit board (PCB)). According to an embodiment, the antenna module 197 may include a plurality of antennas. In this case, at least one antenna appropriate for a communication scheme used in a communication network, such as the first network 198 or the second network 199, may be selected from the plurality of antennas by, e.g., the communication module 190. The signal or the power may then be transmitted or received between the communication module 190 and the external electronic device via the selected at least one antenna. According to an embodiment, other parts (e.g., radio frequency integrated circuit (RFIC)) than the radiator may be further formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2A:
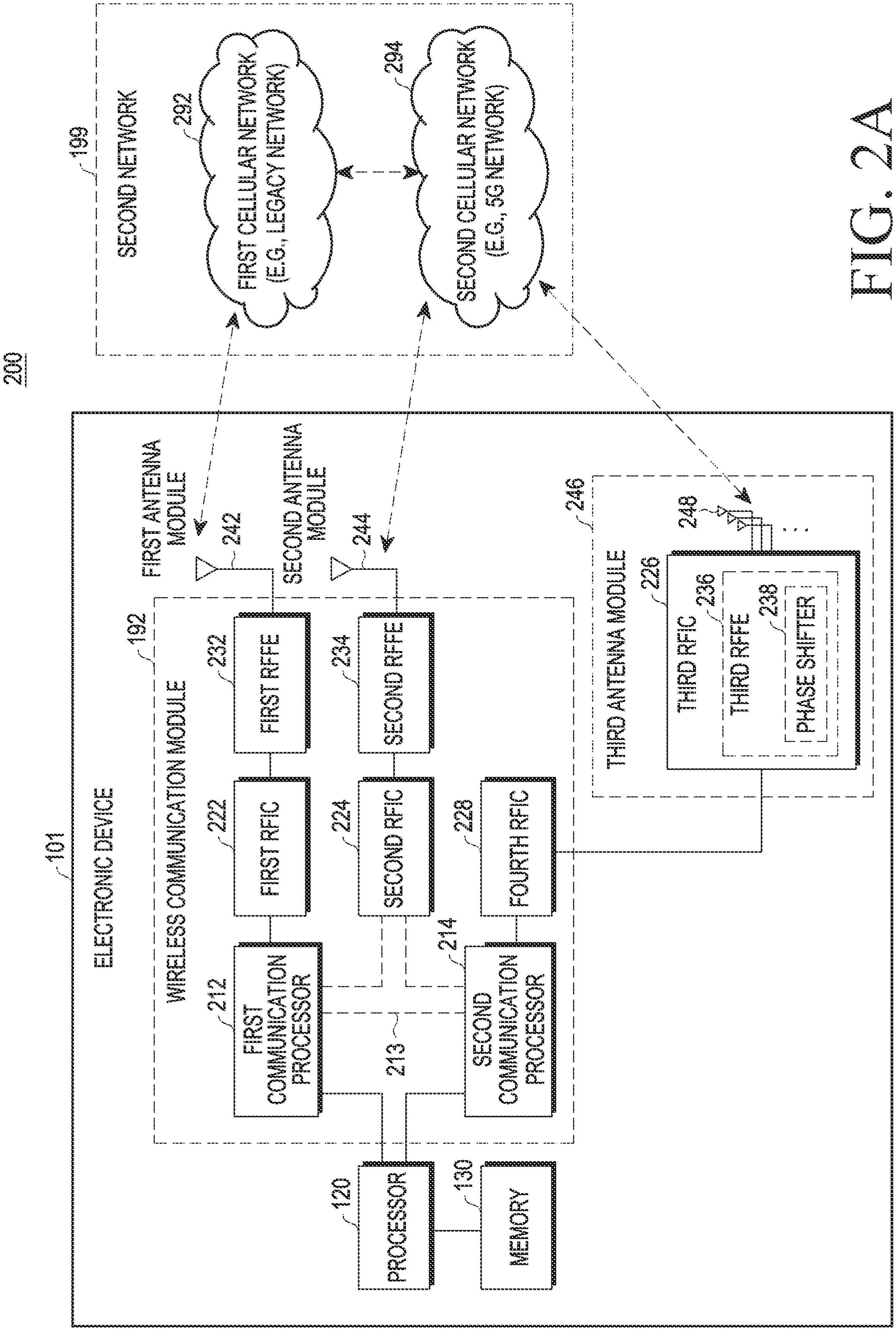
FIG. 2A is a block diagram illustrating an electronic device for supporting legacy network communication and 5th generation (5G) network communication according to an embodiment of the disclosure.

FIG. 2A is a block diagram illustrating an electronic device for supporting legacy network communication and $5^{th}$ generation (5G) network communication according to an embodiment of the disclosure.

Referring to FIG. 2A depicting block diagram 200, the electronic device 101 may include a first communication processor (CP) 212, a second communication processor 214, a first radio frequency integrated circuit (RFIC) 222, a second RFIC 224, a third RFIC 226, a fourth RFIC 228, a first radio frequency front end (RFFE) 232, a second RFFE 234, a first antenna module 242, a second antenna module 244, and an antenna 248. The electronic device 101 may further include a processor 120 and a memory 130. The second network 199 may include a first network 292 and a second network 294. According to an embodiment, the electronic device 101 may further include at least one component among the components of FIG. 1, and the second network 199 may further include at least one other network. According to an embodiment, the first communication processor 212, the second communication processor 214, the first RFIC 222, the second RFIC 224, the fourth RFIC 228, the first RFFE 232, and the second RFFE 234 may form at least part of the wireless communication module 192. According to another embodiment, the fourth RFIC 228 may be omitted or be included as part of the third RFIC 226.

The first CP 212 may establish a communication channel of a band that is to be used for wireless communication with the first network 292 or may support a legacy network via the established communication channel According to an embodiment, the first network may be a legacy network that includes second generation (2G), third generation (3G), fourth generation (4G), or long-term evolution (LTE) networks. The second CP 214 may establish a communication channel corresponding to a designated band (e.g., from about 6 GHz to about 60 GHz) among bands that are to be used for wireless communication with the second network 294 or may support fifth generation (5G) network communication via the established communication channel According to an embodiment, the second network 294 may be a 5G network defined by the 3rd generation partnership project (3GPP). Additionally, according to an embodiment, the first CP 212 or the second CP 214 may establish a communication channel corresponding to another designated band (e.g., about 6 GHz or less) among the bands that are to be used for wireless communication with the second network 294 or may support fifth generation (5G) network communication via the established communication channel.

The first communication processor 212 may perform data transmission/reception with the second communication processor 214. For example, data classified as transmitted via the second cellular network 294 may be changed to be transmitted via the first cellular network 292. In this case, the first communication processor 212 may receive transmission data from the second communication processor 214.

For example, the first communication processor 212 may transmit/receive data to/from the second communication processor 214 via an inter-processor interface 213. The inter-processor interface 213 may be implemented as, e.g., universal asynchronous receiver/transmitter (UART) (e.g., high speed-UART (HS-UART)) or peripheral component interconnect bus express (PCIe) interface, but is not limited to a specific kind. The first communication processor 212 and the second communication processor 214 may exchange packet data information and control information using, e.g., a shared memory. The first communication processor 212 may transmit/receive various pieces of information, such as sensing information, output strength information, or resource block (RB) allocation information, to/from the second communication processor 214.

According to implementation, the first communication processor 212 may not be directly connected with the second communication processor 214. In this case, the first communication processor 212 may transmit/receive data to/from the second communication processor 214 via a processor 120 (e.g., an application processor). For example, the first communication processor 212 and the second communication processor 214 may transmit/receive data to/from the processor 120 (e.g., an application processor) via an HS-UART interface or PCIe interface, but the kind of the interface is not limited thereto. The first communication processor 212 and the second communication processor 214 may exchange control information and packet data information with the processor 120 (e.g., an application processor) using a shared memory.

According to an embodiment, the first CP 212 and the second CP 214 may be implemented in a single chip or a single package. According to an embodiment, the first communication processor 212 or the second communication processor 214, along with the processor 120, an auxiliary processor 123, or communication module 190, may be formed in a single chip or single package. For example, referring to FIG. 2B, an integrated communication processor 260 may support all of the functions for communication with the first cellular network and the second cellular network.

Figure 2B:
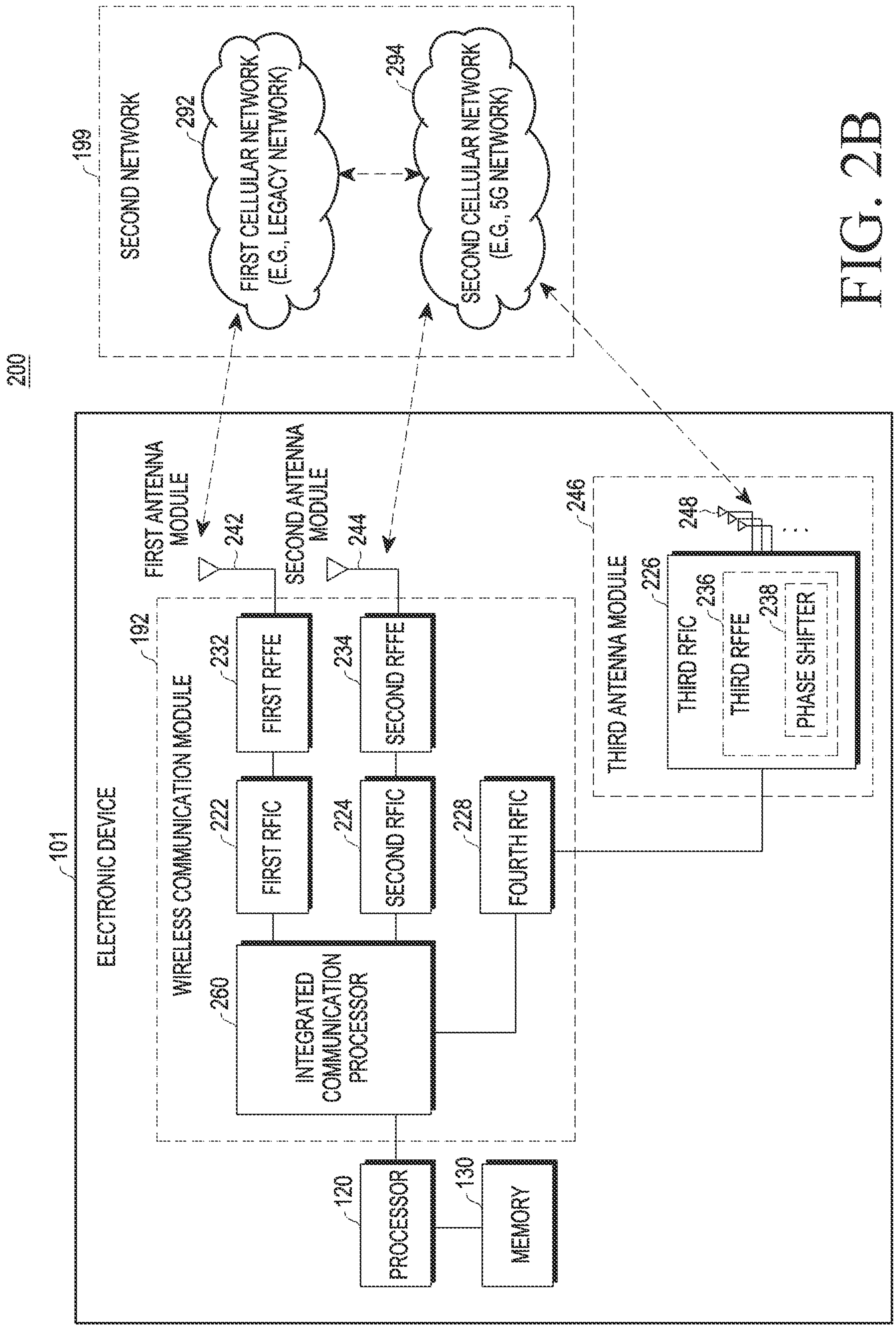
FIG. 2B is a block diagram illustrating an electronic device for supporting legacy network communication and 5G network communication according to an embodiment of the disclosure.

FIG. 2B is a block diagram illustrating an electronic device for supporting legacy network communication and 5G network communication according to an embodiment of the disclosure.

Referring to FIG. 2B, upon transmission, the first RFIC 222 may convert a baseband signal generated by the first CP 212 into a radio frequency (RF) signal with a frequency ranging from about 700 MHz to about 3 GHz which is used by the first network 292 (e.g., a legacy network). Upon receipt, the RF signal may be obtained from the first network 292 (e.g., a legacy network) through an antenna (e.g., the first antenna module 242) and be pre-processed via an RFFE (e.g., the first RFFE 232). The first RFIC 222 may convert the pre-processed RF signal into a baseband signal that may be processed by the first communication processor 212.

Upon transmission, the second RFIC 224 may convert the baseband signal generated by the first CP 212 or the second CP 214 into a Sub6-band (e.g., about 6 GHz or less) RF signal (hereinafter, “5G Sub6 RF signal”) that is used by the second network 294 (e.g., a 5G network). Upon receipt, the 5G Sub6 RF signal may be obtained from the second network 294 (e.g., a 5G network) through an antenna (e.g., the second antenna module 244) and be pre-processed via an RFFE (e.g., the second RFFE 234). The second RFIC 224 may convert the pre-processed 5G Sub6 RF signal into a baseband signal that may be processed by a corresponding processor of the first communication processor 212 and the second communication processor 214.

The third RFIC 226 may convert the baseband signal generated by the second communication processor 214 into a 5G Above6 band (e.g., from about 6 GHz to about 60 GHz) RF signal (hereinafter, “5G Above6 RF signal”) that is to be used by the second network 294 (e.g., a 5G network). Upon receipt, the 5G Above6 RF signal may be obtained from the second network 294 (e.g., a 5G network) through an antenna (e.g., the antenna 248) and be pre-processed via the third RFFE 236. The third RFIC 226 may convert the pre-processed 5G Above6 RF signal into a baseband signal that may be processed by the second communication processor 214. According to an embodiment, the third RFFE 236 may be formed as part of the third RFIC 226.

According to an embodiment, the electronic device 101 may include the fourth RFIC 228 separately from, or as at least part of, the third RFIC 226. In this case, the fourth RFIC 228 may convert the baseband signal generated by the second communication processor 214 into an intermediate frequency band (e.g., from about 9 GHz to about 11 GHz) RF signal (hereinafter, “IF signal”) and transfer the IF signal to the third RFIC 226. The third RFIC 226 may convert the IF signal into a 5G Above6 RF signal. Upon receipt, the 5G Above6 RF signal may be received from the second network 294 (e.g., a 5G network) through an antenna (e.g., the antenna 248) and be converted into an IF signal by the third RFIC 226. The fourth RFIC 228 may convert the IF signal into a baseband signal that may be processed by the second communication processor 214.

According to an embodiment, the first RFIC 222 and the second RFIC 224 may be implemented as at least part of a single chip or single package. According to an embodiment, the first RFFE 232 and the second RFFE 234 may be implemented as at least part of a single chip or single package. According to an embodiment, at least one of the first antenna module 242 or the second antenna module 244 may be omitted or be combined with another antenna module to process multi-band RF signals.

According to an embodiment, the third RFIC 226 and the antenna 248 may be disposed on the same substrate to form the third antenna module 246. For example, the wireless communication module 192 or the processor 120 may be disposed on a first substrate (e.g., a main printed circuit board (PCB)). In this case, the third RFIC 226 and the antenna 248, respectively, may be disposed on one area (e.g., the bottom) and another (e.g., the top) of a second substrate (e.g., a sub PCB) which is provided separately from the first substrate, forming the third antenna module 246. Placing the third RFIC 226 and the antenna 248 on the same substrate may shorten the length of the transmission line therebetween. This may reduce a loss (e.g., attenuation) of high-frequency band (e.g., from about 6 GHz to about 60 GHz) signal used for 5G network communication due to the transmission line. Thus, the electronic device 101 may enhance the communication quality with the second network 294 (e.g., a 5G network).

According to an embodiment, the antenna 248 may be formed as an antenna array which includes a plurality of antenna elements available for beamforming. In this case, the third RFIC 226 may include a plurality of phase shifters 238 corresponding to the plurality of antenna elements, as part of the third RFFE 236. Upon transmission, the plurality of phase shifters 238 may change the phase of the 5G Above6 RF signal which is to be transmitted to the outside (e.g., a 5G network base station) of the electronic device 101 via their respective corresponding antenna elements. Upon receipt, the plurality of phase shifters 238 may change the phase of the 5G Above6 RF signal received from the outside to the same or substantially the same phase via their respective corresponding antenna elements. This allows transmission or reception via beamforming between the electronic device 101 and the outside.

The second network 294 (e.g., a 5G network) may be operated independently (e.g., as standalone (SA)) from, or in connection (e.g., as non-standalone (NSA)) with the first network 292 (e.g., a legacy network). For example, the 5G network may include access networks (e.g., 5G radio access networks (RANs)) but lack any core network (e.g., a next-generation core (NGC)). In this case, the electronic device 101, after accessing a 5G network access network, may access an external network (e.g., the Internet) under the control of the core network (e.g., the evolved packet core (EPC)) of the legacy network. Protocol information (e.g., LTE protocol information) for communication with the legacy network or protocol information (e.g., New Radio (NR) protocol information) for communication with the 5G network may be stored in the memory 130 and be accessed by other components (e.g., the processor 120, the first communication processor 212, or the second communication processor 214).

Figure 3:
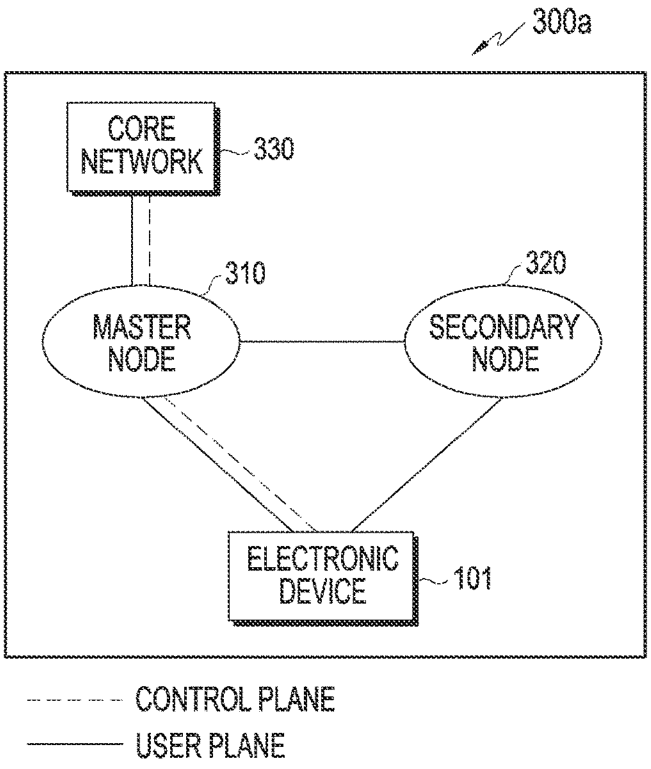
FIG. 3 is a view illustrating wireless communication systems providing a legacy communication network and/or a 5G communication network according to an embodiment of the disclosure.

FIG. 3 is a view illustrating wireless communication systems providing a legacy communication network and/or a 5G communication network according to an embodiment of the disclosure.

Referring to FIG. 3, the network environment 300*a* may include at least one of a legacy network and a 5G network. The legacy network may include, e.g., a 3GPP-standard 4G or LTE base station 340 (e.g., an evolved Node B (eNodeB, eNB)) that supports radio access with the electronic device 101 and an evolved packet core (EPC) that manages 4G communication. The 5G network may include, e.g., a new radio (NR) base station (e.g., a next generation Node B (gNodeB, gNB)) that supports radio access with the electronic device 101 and a 5th generation core (5GC) that manages 5G communication for the electronic device 101.

According to an embodiment, the electronic device 101 may transmit or receive control messages and user data via legacy communication and/or 5G communication. The control messages may include, e.g., messages related to at least one of security control, bearer setup, authentication, registration, or mobility management for the electronic device 101. The user data may mean, e.g., user data except for control messages transmitted or received between the electronic device 101 and the core network 330 (e.g., the EPC).

Referring to FIG. 3, according to an embodiment, the electronic device 101 may transmit or receive at least one of a control message or user data to/from at least part (e.g., the NR base station or 5GC) of the 5G network via at least part (e.g., the LTE base station or EPC) of the legacy network.

According to various embodiments, the network environment 300*a* may include a network environment that provides wireless communication dual connectivity (DC) to the LTE base station and the NR base station and transmits or receives control messages to/from the electronic device 101 via one core network 330 of the EPC or the 5GC.

According to various embodiments, in the DC environment, one of the LTE base station or the NR base station may operate as a master node (MN) 310, and the other as a secondary node (SN) 320. The MN 310 may be connected with the core network 330 to transmit or receive control messages. The MN 310 and the SN 320 may be connected with each other via a network interface to transmit or receive messages related to radio resource (e.g., communication channel) management therebetween.

According to various embodiments, the MN 310 may include the LTE base station 340, the SN may include the NR base station, and the core network 330 may include the EPC. For example, control messages may be transmitted/received via the LTE base station and the EPC, and user data may be transmitted/received at least one of the LTE base station or the NR base station.

According to an embodiment, the MN 310 may include the NR base station, the SN 320 may include the LTE base station, and the core network 330 may include the 5GC. For example, control messages may be transmitted/received via the NR base station and the 5GC, and user data may be transmitted/received at least one of the LTE base station or the NR base station.

According to an embodiment, the electronic device 101 may be registered in at least one of the EPC or the 5GC to transmit or receive control messages.

According to an embodiment, the EPC or the 5GC may interwork with each other to manage communication for the electronic device 101. For example, mobility information for the electronic device 101 may be transmitted or received via the interface between the EPC and the 5GC.

As set forth above, dual connectivity via the LTE base station and the NR base station may be referred to as E-UTRA new radio dual connectivity (EN-DC). Besides the EN-DC, the multi-radio access technology (multi-RAT) dual connectivity (MR DC) may have other various applications. For example, a first network and a second network by the MR DC may be both related to LTE communication, and the second network may be a network corresponding to a small cell of a specific frequency. For example, the first network and the second network by the MR DC may be both related to 5G, and the first network may correspond to a frequency band (e.g., below 6) less than 6 GHz, and the second network may correspond to a frequency band (e.g., over 6) not less than 6 GHz. It will be easily appreciated by one of ordinary skill in the art that other various dual-connectivity-applicable network structures may be applied to various embodiments of the disclosure.

Figure 4:
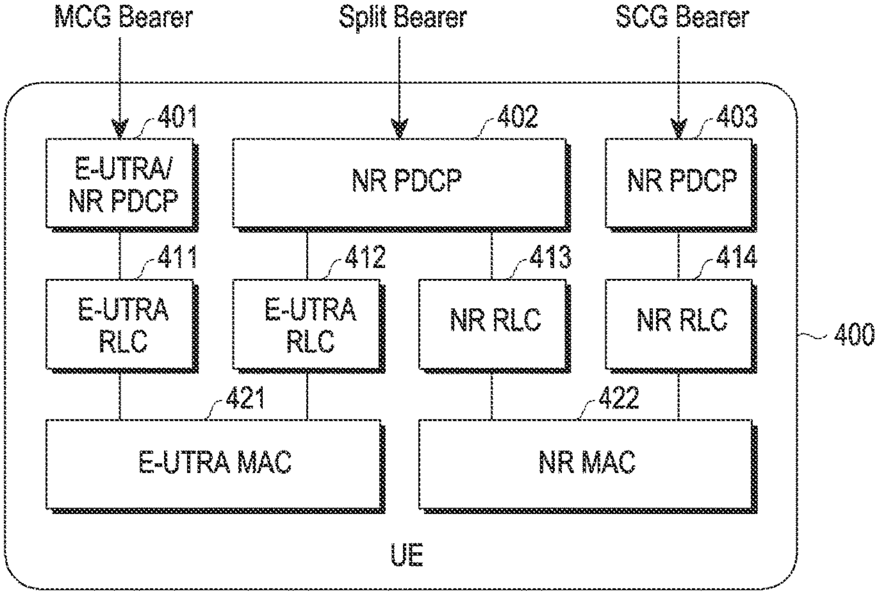
FIG. 4 is a view illustrating a bearer in a user equipment (UE) according to an embodiment of the disclosure.

FIG. 4 is a view illustrating a bearer in a UE according to an embodiment of the disclosure.

Referring to FIG. 4, according to various embodiments, bearers possible in the 5G non-standalone network environment (e.g., the network environment 300*a* of FIG. 3) may include a master cell group (MCG) bearer, a secondary cell group (SCG) bearer, and a split bearer. An E-UTRA/NR (packet data convergence protocol) PDCP entity 401 and NR PDCP entities 402 and 430 may be configured in a user equipment (UE) 400 (e.g., the electronic device 101). E-UTRA radio link control (RLC) entities 411 and 412 and NR RLC entities 413 and 414 may be configured in the UE 400. An E-UTRA medium access control (MAC) entity 421 and an NR MAC entity 422 may be configured in the UE 400. The UE may be a user device capable of communicating with base stations, and the UE may be interchangeably used with the electronic device 101 of FIG. 1. For example, when the UE performs a specific operation according to various embodiments of the disclosure, this may mean that at least one component of the electronic device 101 performs the specific operation.

According to various embodiments, the MCG may correspond to, e.g., the main node or master node (MN) 310 of FIG. 3, and the SCG may correspond to the secondary node (SN) 320 of FIG. 3. The UE 400, if a node for communication is determined, may configure various entities as shown in FIG. 4 for communication with the determined node (e.g., a base station). The PDCP layer entities 401, 402, and 403 may receive data (e.g., PDCP SDU corresponding to IP packet) and output converted data (e.g., PDCP protocol data unit (PDU)) to which additional information (e.g., header information) has been applied. RLC layer entities 411, 412, 413, and 414 may receive the converted data (e.g., PDCP PDU) from the PDCP layer entities 401, 402, and 403 and output converted data (e.g., RLC PDU) to which additional information (e.g., header information) has been applied. MAC layer entities 421 and 422 may receive the converted data (e.g., RLC PDU) from the RLC layer entities 411, 412, 413, and 414 and output converted data (e.g., MAC PDU) to which additional information (e.g., header information) has been applied and transfer to the physical layer (not shown).

According to various embodiments, the MCG bearer may be associated with a path (or data) through which data may be transmitted/received only using the entity or resources corresponding to the MN in dual connectivity. The SCG bearer may be associated with a path (or data) through which data may be transmitted/received only using the entity or resources corresponding to the SN in dual connectivity. The split bearer may be associated with a path (or data) through which data may be transmitted/received using the entity or resources corresponding to the MN and the entity or resources corresponding to the SN in dual connectivity. Thus, as shown in FIG. 4, the split bearer may be associated with all of the E-UTRA RLC entity 412 and the NR RLC entity 413 and the E-UTRA MAC entity 421 and NR MAC entity 422 via the NR PDCD entity 402.

FIGS. 5A, 5B, 5C, and 5D are block diagrams illustrating an electronic device providing dual-connectivity according to various embodiments of the disclosure.

Figure 5A:
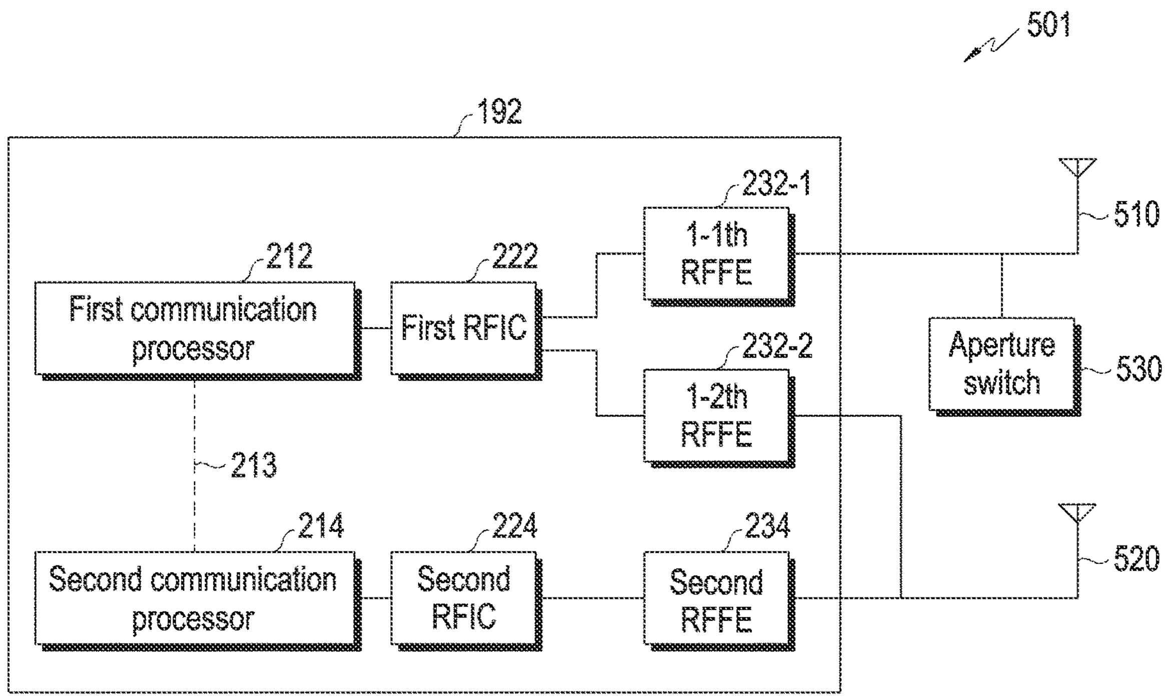
FIGS. 5A, 5B, 5C, and 5D are block diagrams illustrating an electronic device providing dual-connectivity, according to various embodiments of the disclosure.

According to an embodiment, FIG. 5A may be a view 501 illustrating an electronic device 101 including a first communication processor 212 and a second communication processor 214.

Referring to FIG. 5A, in an embodiment, the wireless communication module 192 may include a first communication processor 212, a second communication processor 214, a first radio frequency integrated circuit (RFIC) 222, a second RFIC 224, a 1-1th radio frequency front end circuit (RFFE) 232-1, a 1-2th RFFE 232-2, and a second RFFE 234.

In an embodiment, the first communication processor 212 may establish a communication channel of a band to be used for wireless communication with the first network communication and/or support network communication (e.g., 2G (or 2nd generation), 3G, 4G, or long-term evolution (LTE) communication) through the established communication channel.

In an embodiment, the second communication processor 214 may establish a communication channel of a band (e.g., Sub6 band (e.g., about 6 GHz or less) or Above6 band (e.g., about 6 GHz to about 60 GHz)) to be used for wireless communication with the second network communication and/or support 5G network communication through the established communication channel.

In an embodiment, the first communication processor 212 may perform data transmission/reception with the second communication processor 214. For example, the first communication processor 212 may transmit/receive data with the second communication processor 214 through an interprocessor interface 213 (e.g., a universal asynchronous receiver/transmitter (UART) or a peripheral component interconnect standard (PCIe) interface). In an embodiment, the first communication processor 212 may transmit/receive at least one piece of information among activated band information, channel allocation information, information about communication states (idle, sleep, and active) with the network, sensing information, output strength information, or resource block (RB) allocation information to/from the second communication processor 214. However, without limitations thereto, the first communication processor 212 may not be directly connected with the second communication processor 214. In this case, the first communication processor 212 may transmit/receive data to/from the second communication processor 214 via a processor (e.g., an application processor).

In an embodiment, at least one of the first communication processor 212 or the second communication processor 214 may control the switching operation of the aperture switch 530 based on a plurality of antenna settings stored in the memory 130. A method in which at least one of the first communication processor 212 or the second communication processor 214 controls the switching operation of the aperture switch 530 based on the plurality of antenna settings stored in the memory 130 is described below in detail.

In an embodiment, the first antenna 510 may receive communication signals of a frequency band within a first frequency band range including a frequency band lower than a designated frequency. For example, the first antenna 510 may receive communication signals of a frequency band within the first frequency band range (e.g., a band range less than 1 GHz) (hereinafter, denoted as 'first frequency band range') including a frequency band lower than 1 GHz as the designated frequency.

In an embodiment, the first antenna 510 may be based on the first network communication (interchangeably used with 'LTE communication') and receive communication signals of the frequency band within the first frequency band range. For example, the first antenna 510 may be an antenna that is based on LTE communication and is able to receive communication signals of the frequency band lower than 1 GHz.

In an embodiment, the second antenna 520 may receive communication signals of a frequency band within a second frequency band range including a frequency band not lower than the designated frequency. For example, the second antenna 520 may receive communication signals of a frequency band within the second frequency band range (e.g., 1 GHz to 6 GHz) (hereinafter, denoted as 'second frequency band range') including a frequency band not lower than 1 GHz as the designated frequency.

In an embodiment, the second antenna 520 may be based on the second network communication (interchangeably used with 'NR communication') and transmit (or radiate) communication signals of the frequency band within the second frequency band range. For example, the second antenna 520 may be an antenna that is based on NR communication and is able to transmit communication signals of the frequency band not lower than 1 GHz.

In an embodiment, the electronic device 101 may further include at least one antenna other than the first antenna 510 and the second antenna 520. The communication signals of a frequency band within the second frequency band, which are based on the second network communication (e.g., NR communication) among the plurality of antennas included in the electronic device 101 may be transmitted through the second antenna 520.

In an embodiment, the aperture switch 530 may be connected to the first antenna 510. In an embodiment, the impedance of the second antenna 520 may be changed by the switching operation of the aperture switch 530 connected to the first antenna 510. For example, a different parasitic capacitance may be formed according to the switching operation of the aperture switch 530 connected to the first antenna 510, and the impedance of the second antenna 520 may be affected by the formed parasitic capacitance. In an embodiment, the first antenna 510 and the second antenna 520 may be disposed within a distance where the impedance of the second antenna 520 may be changed by the switching operation of the aperture switch 530 connected to the first antenna 510.

In an embodiment, the first antenna 510 and the second antenna 520 may be implemented of one or more metals, and the first antenna 510 and the second antenna 520 may be configured by a ground (or ground portion) connected to one or more metals.

In an embodiment, although FIG. 5A illustrates an example in which the aperture switch 530 is connected to the first antenna 510, embodiments of the disclosure are not limited thereto. For example, the aperture switch 530 may be connected to the second antenna 520, not to the first antenna 510. Even when the aperture switch 530 is connected to the second antenna 520, the impedance of the first antenna 510 and the impedance of the second antenna 520 may be changed according to the switching state of the aperture switch 530. As another example, FIG. 5A illustrates an example in which there is one aperture switch 530, but two aperture switches may be connected to the first antenna 510 and the second antenna 520, respectively.

In an embodiment, although FIG. 5A illustrates the first antenna 510 and the second antenna 520 as an example, embodiments of the disclosure are not limited thereto. For example, in addition to the first antenna 510 and the second antenna 520, the electronic device 101 may further include at least one antenna capable of transmitting or receiving communication signals based on the first network or the second network.

In an embodiment, the 1-1th RFFE 232-1 may preprocess the communication signals of the frequency band within the first frequency band received through the first antenna 510. For example, the 1-2th RFFE 232-2 may include a low noise amplifier capable of amplifying communication signals of the frequency band within the first frequency band range and based on the first network communication (e.g., LTE communication) and received through the first antenna 510.

In an embodiment, the 1-2th RFFE 232-2 may preprocess the communication signals of the frequency band within the second frequency band range, received through the second antenna 520. For example, the 1-2th RFFE 232-2 may include an LNA capable of amplifying communication signals of the frequency band within the second frequency band range based on the first network communication (e.g., LTE communication) and received through the second antenna 520.

In an embodiment, the second RFFE 234 may amplify the communication signal received through the second RFIC 224. For example, the second RFFE 234 may include a power amplifier module (PAM) for amplifying the communication signals of the frequency band within the second frequency band range, based on the second network communication (e.g., NR communication) and received from the second RFIC 224.

In an embodiment, the second RFFE 234 may preprocess the communication signals of the frequency band within the second frequency band range, received through the second antenna 520. For example, the second RFFE 234 may include an LNA capable of amplifying communication signals of the frequency band within the second frequency band range based on the second network communication (e.g., NR communication) and received through the second antenna 520.

In an embodiment, the first RFIC 222 may convert the communication signal of the frequency band within the first frequency band range, based on the first network communication, or the communication signal of the frequency band within the second frequency band range, based on the first network communication, as received from the 1-1th RFFE 232-1 or the 1-2th RFFE 232-2, into a baseband signal. In an embodiment, the first RFIC 222 may transfer the converted baseband signal to the first communication processor 212.

In an embodiment, the second RFIC 224 may convert the baseband signal received from the second communication processor 214 into a communication signal (e.g., the communication signal of the frequency band within the second frequency band range, based on NR communication). In an embodiment, the second RFIC 224 may transfer the converted communication signal to the second RFFE 234.

In an embodiment, the second RFIC 224 may convert the communication signal received from the second RFFE 234 (e.g., the communication signal of the frequency band within the second frequency band range, based on NR communication) into a baseband signal. In an embodiment, the second RFIC 224 may transfer the converted baseband signal to the second communication processor 214.

Although not described in the above-described examples, in an embodiment, the communication signal within the first frequency band range, based on the second network communication (e.g., NR communication), may be transmitted or received through the first antenna 510.

For example, the first antenna 510 may receive the communication signal within the first frequency band range, based on the second network communication (e.g., NR communication). The first antenna 510 may transfer the received communication signal to the second RFFE 234 (or a separate (or additional) RFFE (not shown)) capable of preprocessing the received communication signal, through a line (not shown) connected with the first antenna 510 and the second RFFE 234 (or separate RFFE). The communication signal amplified through the second RFFE 234 (or separate RFFE) may be transferred to the second communication processor 214 through the second RFIC 224.

As another example, the first antenna 510 may transmit the communication signal within the first frequency band range, based on the second network communication (e.g., NR communication). The second RFIC 224 may convert the baseband signal based on the second network communication received from the second communication processor 214 into a baseband signal and transfer the converted communication signal to the second RFFE 234 or separate RFFE (not shown) for amplifying the converted communication signal. As the second RFFE 234 (or separate RFFE) amplifies the received communication signal and transfers the amplified communication signal to the line (not shown) connecting the second RFFE 234 (or separate RFFE) and the first antenna 510, the communication signal within the first frequency band range and based on the second network communication (e.g., NR communication) may be transmitted.

In an embodiment, when the communication signal within the first frequency band range and based on the second network communication (e.g., NR communication) is able to be transmitted or received through the first antenna 510, the communication signal within the first frequency band range and based on the second network communication (e.g., NR communication) may be transmitted through the first antenna 510 among the plurality of antennas included in the electronic device 101.

In an embodiment, the aperture switch 530 may include a plurality of switches. In an embodiment, the resonance characteristics of the first antenna 510 and/or the second antenna 520 may be changed according to the switching operations of the plurality of switches included in the aperture switch 530. A detailed configuration of the aperture switch 530 and a switching operation of the aperture switch 530 are described below in detail.

Figure 5B:
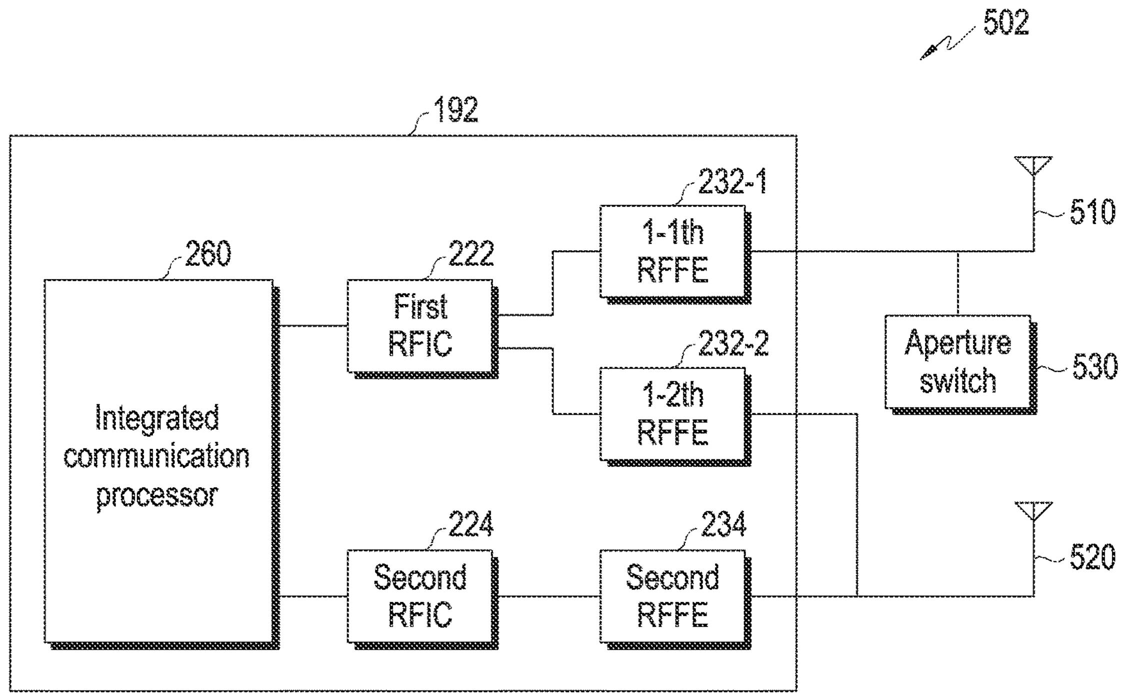

In an embodiment, FIG. 5B may be a view 502 illustrating an electronic device 101 including an integrated communication processor 260.

Referring to FIG. 5B, in an embodiment, the wireless communication module 192 may include an integrated communication processor 260, a first RFIC 222, a second RFIC 224, a 1-1th RFFE 232-1, a 1-2th RFFE 232-2, and a second RFFE 234.

In an embodiment, the integrated communication processor 260 may establish a communication channel of a band to be used for wireless communication with the first network communication and/or support network communication (e.g., 2G (or 2nd generation)), 3G, 4G, or long-term evolution (LTE) communication) through the established communication channel. In an embodiment, the integrated communication processor 260 may establish a communication channel of a band (e.g., Sub6 band (e.g., about 6 GHz or less) or Above6 band (e.g., about 6 GHz to about 60 GHz)) to be used for wireless communication with the second network communication and/or support 5G network communication through the established communication channel.

In an embodiment, the description of the first RFIC 222, the second RFIC 224, the 1-1th RFFE 232-1, the 1-2th RFFE 232-2, and the second RFFE 234 of FIG. 5B is at least partially identical or similar to the description of the first RFIC 222, the second RFIC 224, the 1-1th RFFE 232-1, the 1-2th RFFE 232-2, and the second RFFE 234 of FIG. 5A. Thus, no detailed description is given of the first RFIC 222, the second RFIC 224, the 1-1th RFFE 232-1, the 1-2th RFFE 232-2, and the second RFFE 234 of FIG. 5B. Further, the description of the first antenna 510, the second antenna 520, and the aperture switch 530 of FIG. 5B is at least partially identical or similar to the description of the first antenna 510, the second antenna 520, and the aperture switch 530 of FIG. 5A. Thus, no detailed description is given of the first antenna 510, the second antenna 520, and the aperture switch 530 of FIG. 5B.

Figure 5C:
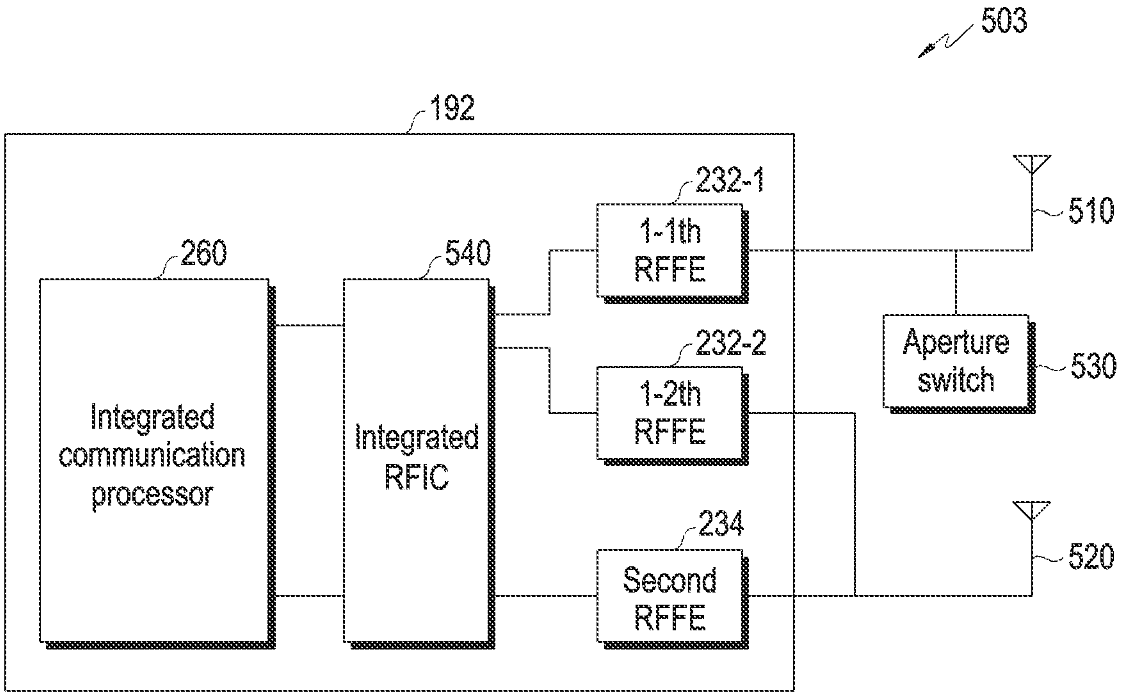

In an embodiment, FIG. 5C may be a view 503 illustrating an electronic device 101 including an integrated communication processor 260 and an integrated RFIC 540.

Referring to FIG. 5C, in an embodiment, the wireless communication module 192 may include an integrated communication processor 260, an integrated RFIC 540, a 1-1th RFFE 232-1, a 1-2th RFFE 232-2, and a second RFFE 234.

In an embodiment, the integrated RFIC 540 may convert the communication signal of the frequency band within the first frequency band range and based on first network communication, received from the 1-1th RFFE 232-1 or the 1-2th RFFE 232-2 (e.g., communication signal of the frequency band within the first frequency band range and based on LTE communication or communication signal of the frequency band within the first frequency band range and based on NR communication) into a baseband signal. In an embodiment, the integrated RFIC 540 may transfer the converted baseband signal to the first communication processor 212.

In an embodiment, the integrated RFIC 540 may convert the baseband signal received from the second communication processor 214 into a communication signal (e.g., the communication signal of the frequency band within the second frequency band range, based on NR communication). In an embodiment, the integrated RFIC 540 may transfer the converted communication signal to the second RFFE 234.

In an embodiment, the integrated RFIC 540 may convert the communication signal received from the second RFFE 234 (e.g., the communication signal of the frequency band within the second frequency band range, based on NR communication) into a baseband signal. In an embodiment, the integrated RFIC 540 may transfer the converted baseband signal to the second communication processor 214.

In an embodiment, the description of the integrated communication processor 260, the 1-1th RFFE 232-1, the 1-2th RFFE 232-2, and the second RFFE 234 of FIG. 5C is at least partially identical or similar to the description of the integrated communication processor 260, the 1-1th RFFE 232-1, the 1-2th RFFE 232-2, and the second RFFE 234 of FIG. 5B. Thus, no detailed description is given of the integrated communication processor 260, the 1-1th RFFE 232-1, the 1-2th RFFE 232-2, and the second RFFE 234 of FIG. 5C. Further, the description of the first antenna 510, the second antenna 520, and the aperture switch 530 of FIG. 5C is at least partially identical or similar to the description of the first antenna 510, the second antenna 520, and the aperture switch 530 of FIG. 5B. Thus, no detailed description is given of the first antenna 510, the second antenna 520, and the aperture switch 530 of FIG. 5C.

Figure 5D:
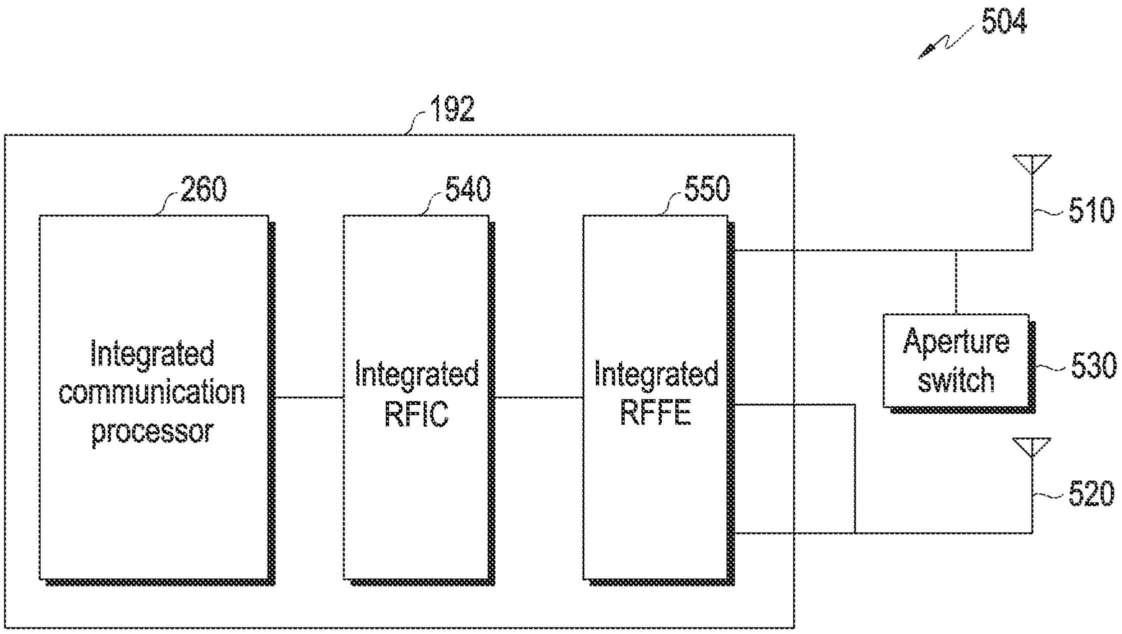

In an embodiment, FIG. 5D may be a view 504 illustrating an electronic device 101 including an integrated communication processor 260, an integrated RFIC 540, and an integrated RFFE 550.

Referring to FIG. 5D, in an embodiment, the wireless communication module 192 may include an integrated communication processor 260, an integrated RFIC 540, and an integrated RFFE 550.

In an embodiment, the integrated RFFE 550 may preprocess the communication signals of the frequency band within the first frequency band range, received through the first antenna 510. In an embodiment, the integrated RFFE 550 may preprocess the communication signals of the frequency band within the second frequency band range, received through the second antenna 520. In an embodiment, the integrated RFFE 550 may amplify the communication signal received through the integrated RFIC 540. In an embodiment, the integrated RFFE 550 may preprocess the communication signals of the frequency band within the second frequency band range, received through the second antenna 520.

In an embodiment, the description of the integrated communication processor 260 and the integrated RFIC 540 of FIG. 5D is at least partially identical or similar to the description of the integrated communication processor 260 and the integrated RFIC 540 of FIG. 5C. Thus, no detailed description is given of the integrated communication processor 260 and the integrated RFIC 540 of FIG. 5D. Further, the description of the first antenna 510, the second antenna 520, and the aperture switch 530 of FIG. 5D is at least partially identical or similar to the description of the first antenna 510, the second antenna 520, and the aperture switch 530 of FIG. 5C. Thus, no detailed description is given of the first antenna 510, the second antenna 520, and the aperture switch 530 of FIG. 5D.

Figure 6:
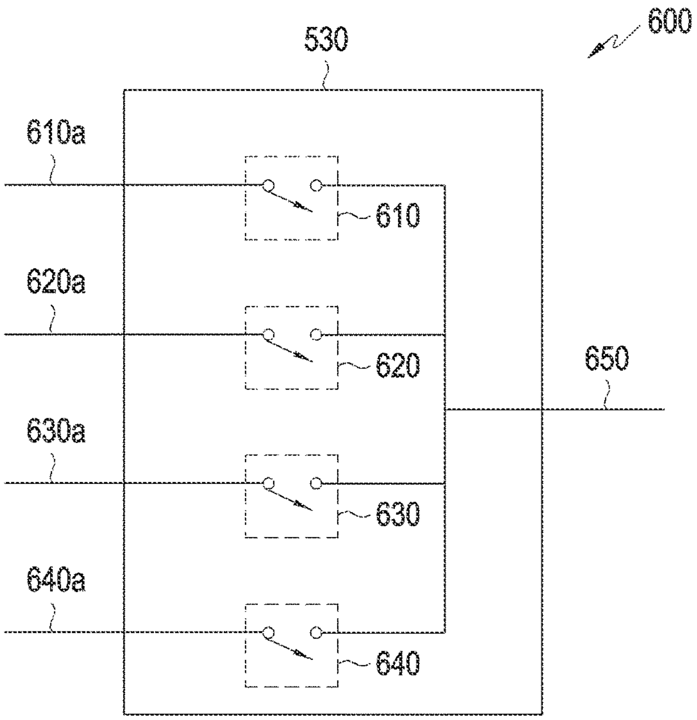
FIG. 6 is a view illustrating an aperture switch according to an embodiment of the disclosure.

FIG. 6 is a view illustrating an aperture switch according to an embodiment of the disclosure.

Referring to FIG. 6 depicting view 600, in an embodiment, an aperture switch 530 may include a first switch 610, a second switch 620, a third switch 630, and a fourth switch 640. In an embodiment, the first switch 610 may be connected with a lumped element having a first impedance and connected with a ground (or ground portion), through a first line 610*a* and be connected with an antenna (or antenna radiator) (e.g., the first antenna 510 or the second antenna 520) through a common line 650. In an embodiment, the second switch 620 may be connected with a lumped element having a second impedance and connected with a ground, through a second line 620*a* and be connected with an antenna (e.g., the first antenna 510 or the second antenna 520) through the common line 650. In an embodiment, the third switch 630 may be connected with a lumped element having a third impedance and connected with a ground, through a third line 630*a* and be connected with an antenna (e.g., the first antenna 510 or the second antenna 520) through the common line 650. In an embodiment, the fourth switch 640 may be connected with a lumped element having a fourth impedance and connected with a ground, through a fourth line 640*a* and be connected with an antenna (e.g., the first antenna 510 or the second antenna 520) through the common line 650.

In an embodiment, in the above-described examples, the first switch 610 to the fourth switch 640 are exemplified as respectively connected with the lumped elements but are not limited thereto. For example, at least some of the first switch 610 to the fourth switch 640 may be connected with the ground without connection to lumped elements through at least one of the first line 610*a* to the fourth line 640*a*.

In an embodiment, according to the switching operation of the aperture switch 530, the electrical path of the antenna (e.g., the first antenna 510) connected with the aperture switch 530 may be changed.

In an embodiment, referring to FIG. 6, the aperture switch 530 is exemplified as including four switches (e.g., the first switch 610 to the fourth switch 640), but is not limited thereto. For example, the aperture switch 530 may include less than four (e.g., one to three) or four or more switches.

In an embodiment, the aperture switch 530 may be in a total of 16 states (e.g., combined on/off states of the first switch 610 to the fourth switch 640) by the on/off (or open/close) of each of the first switch 610 to the fourth switch 640. In an embodiment, the impedance of the antenna (e.g., the first antenna 510 or the second antenna 520) may be changed to differ depending on the state of the aperture switch 530 by the on/off of the first switch 610 to the fourth switch 640. For example, the antenna may have different resonance characteristics (e.g., the resonance frequency of the antenna) depending on the states of the aperture switch 530 by the on/off of the first switch 610 to the fourth switch 640.

In an embodiment, the states of the aperture switch 530 by the on/off of the first switch 610 to the fourth switch 640 may correspond to the channels of the frequency bands of network communication. For example, a first state of the aperture switch 530 by the on/off of the first switch 610 to the fourth switch 640 may be a state (e.g., a state for allowing the antenna to resonate) for impedance-matching the antenna (e.g., the first antenna 510 or the second antenna 520) to transmit or receive communication signals using a first channel (e.g., at least one channel among a low channel, mid(middle) channel, or high channel) of a first frequency band of first network communication or second network communication.

In an embodiment, the states of the aperture switch 530 by the on/off of the first switch 610 to the fourth switch 640 may correspond to the channels of the frequency bands of network communication. For example, it may be a state (e.g., a state for allowing the antenna to resonate) for impedance-matching the antenna (e.g., the first antenna 510 or the second antenna 520) to transmit or receive communication signals using the channel (e.g., at least one channel among a low channel, mid(middle) channel, or high channel) of the first frequency band range or second frequency band range of second network communication.

In an embodiment, the states of the aperture switch 530 by the on/off of the first switch 610 to the fourth switch 640 or the channels of the frequency bands of network communication may correspond to the antenna settings (e.g., antenna setting values) stored in the memory 130. For example, the processor (e.g., at least one of the first communication processor 212 or the second communication processor 214 or the integrated communication processor 260) may control the switching operation of the aperture switch 530 to change the state of the aperture switch 530 into the state of the aperture switch 530 corresponding to a first setting, based on the first setting among the antenna settings stored in the memory 130. In an embodiment, since the aperture switch 530 may be in a total of 16 states by the on/off of each of the first switch 610 to fourth switch 640, up to 16 antenna settings as stored in the memory 130 may be made.

According to various embodiments of the disclosure, an electronic device 101 may comprise at least one processor 120 configured to support first network communication and second network communication, a plurality of antennas including a first antenna 510 and a second antenna 520, an aperture switch 530 connected to the first antenna 510 or the second antenna 520 to change a resonance characteristic of at least one of the first antenna or the second antenna, and a memory 130 configured to store a plurality of antenna settings to control a switching operation of the aperture switch 530. The at least one processor 120 may be configured to identify whether the electronic device 101 is in a state connected to a first base station corresponding to the first network communication and operated as a master node and a second base station corresponding to the second network communication and operated as a secondary node, upon identifying that the electronic device 101 is in the state, identify information about allocation of a resource for a communication signal using a first frequency band of the second network communication, and control the switching operation of the aperture switch 530 based on an antenna setting corresponding to the first frequency band among the plurality of antenna settings.

According to various embodiments, the plurality of antenna settings may include antenna settings corresponding to a low channel, a mid (middle) channel, and a high channel of a combination of the first frequency band of the second network communication and the second frequency band of the first network communication. The at least one processor 120 may be configured to, upon identifying the information about allocation of the resource for the communication signal, identify an antenna setting corresponding to a channel of the first frequency band among the antenna settings, and control the switching operation of the aperture switch 530 based on the antenna setting corresponding to the channel of the first frequency band among the antenna settings.

According to various embodiments, the at least one processor 120 may be configured to, upon failing to identify the information about allocation of the resource for the communication signal, identify an antenna setting corresponding to a channel of the second frequency band among the antenna settings, and control the switching operation of the aperture switch 530 based on the antenna setting corresponding to the channel of the second frequency band among the antenna settings.

According to various embodiments, the plurality of antenna settings may include antenna settings corresponding to a low channel, a mid channel, and a high channel of the second frequency band of the first network communication. The at least one processor 120 may be configured to, upon identifying that the electronic device is in a state connected to the first base station and not connected to the second base station, identify an antenna setting corresponding to a channel of the second frequency band of the first network communication among the antenna settings, and control the switching operation of the aperture switch 530 based on the antenna setting corresponding to the channel of the second frequency band of the first network communication among the antenna settings.

According to various embodiments, the at least one processor 120 may be configured to, upon failing to identify the information about allocation of the resource for the communication signal, identify whether at least one band of the first frequency band of the second network communication or the second frequency band of the first network communication is within a first frequency band range including a frequency band lower than a designated frequency, and when the at least one band is within the first frequency band range, control the switching operation of the aperture switch 530 based on an antenna setting corresponding to a channel of the at least one band within the first frequency band range among the plurality of antenna settings.

According to various embodiments, the at least one processor 120 may be configured to, when the first frequency band and the second frequency band are not within the first frequency band range, control the switching operation of the aperture switch 530 based on an antenna setting corresponding to a channel of the second frequency band of the first network communication among the plurality of antenna settings.

According to various embodiments, the information about allocation of the resource for the communication signal may include resource block (RB) allocation information.

According to various embodiments, the first antenna 510 may be an antenna for transmitting or receiving a communication signal using a first frequency band range including a frequency band lower than a designated frequency. The second antenna 520 may be an antenna for transmitting or receiving a communication signal using a second frequency band range including a frequency band not lower than the designated frequency. The first network communication may be long-term evolution (LTE) communication, and the second network communication may be new radio (NR) communication.

According to various embodiments of the disclosure, an electronic device 101 may comprise at least one processor 120 configured to support first network communication and second network communication, a plurality of antennas including a first antenna 510 and a second antenna 520, an aperture switch 530 connected to the first antenna 510 or the second antenna 520 to change at least one resonance characteristic of the first antenna or the second antenna, and a memory 130 storing a plurality of antenna settings to control a switching operation of the aperture switch 530. The at least one processor 120 may be configured to identify whether the electronic device 101 is in a state connected to a first base station corresponding to the first network communication and operated as a master node and a second base station corresponding to the second network communication and operated as a secondary node, and upon identifying that the electronic device 101 is in the state, control the switching operation of the aperture switch 530 based on an antenna setting corresponding to a channel of a first frequency band of the second network communication among the plurality of antenna settings.

According to various embodiments, the state may include a long-term evolution (LTE) radio resource control (RRC) connected state for the first base station and an NR RRC connected state or an NR RRC inactive state for the second base station.

According to various embodiments, the plurality of antenna settings may include antenna settings corresponding to a low channel, a mid (middle) channel, and a high channel of a combination of the first frequency band of the second network communication and the second frequency band of the first network communication. The at least one processor 120 may be configured to identify an antenna setting corresponding to a channel of the first frequency band among the antenna settings, and control the switching operation of the aperture switch 530 based on the antenna setting corresponding to the channel of the first frequency band among the antenna settings.

According to various embodiments, the plurality of antenna settings may include antenna settings corresponding to a low channel, a mid channel, and a high channel of the second frequency band of the first network communication. The at least one processor 120 may be configured to, upon identifying that the electronic device is in a state connected to the first base station and not connected to the second base station, identify an antenna setting corresponding to a channel of the second frequency band of the first network communication among the antenna settings, and control the switching operation of the aperture switch 530 based on the antenna setting corresponding to the channel of the second frequency band of the first network communication among the antenna settings.

Figure 7:
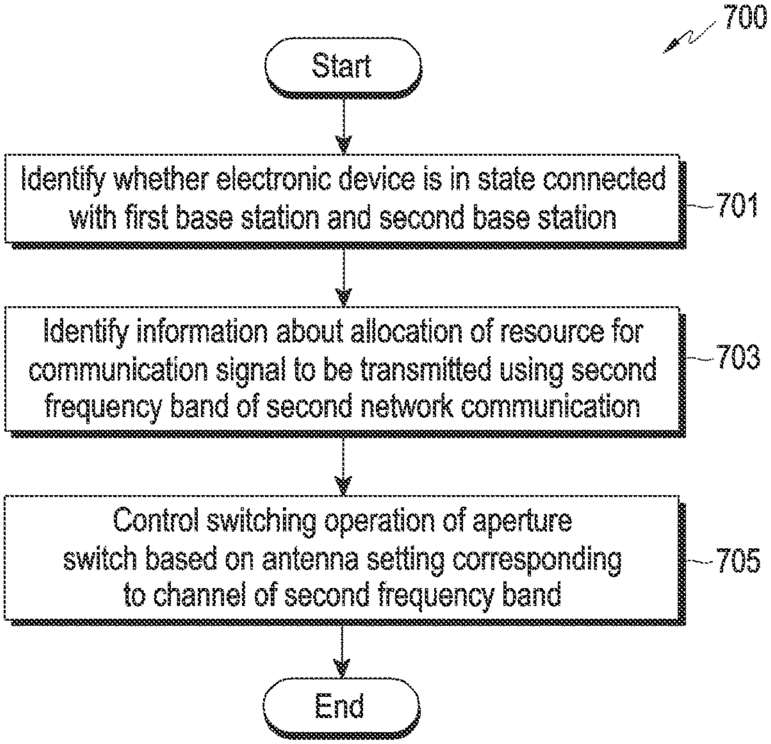
FIG. 7 is a flowchart illustrating a method for controlling an aperture switch in evolved universal terrestrial radio access (E-UTRA) new radio dual connectivity (ENDC) according to an embodiment of the disclosure.

FIG. 7 is a flowchart illustrating a method for controlling an aperture switch in evolved universal terrestrial radio access (E-UTRA) new radio dual connectivity (ENDC) according to an embodiment of the disclosure.

FIG. 8 is a view illustrating a table including some of a plurality of antenna settings according to an embodiment of the disclosure.

Referring to FIG. 7 depicting flowchart 700, in operation 701, in an embodiment, the processor 120 may identify whether the electronic device 101 is in a state of being connected to a first base station corresponding to first network communication and operated as a master node and a second base station corresponding to second network communication and operated as a secondary node (hereinafter, denoted as a 'first state').

In an embodiment, the first network communication may be LTE communication, and the first base station (hereinafter, denoted as a 'first base station') may be an LTE base station (e.g., eNB, eNodeB). In an embodiment, the second network communication may be 5G communication, and the second base station (hereinafter, denoted as a 'second base station') may be an NR base station (e.g., GNB (GNodeB)).

In an embodiment, the first state of the electronic device 101 may include a radio resource control (RRC) connected state (denoted as 'LTE RRC connected state') of the electronic device 101 for the first base station and an RRC connected state (denoted as 'NR RRC connected state') of the electronic device 101 for the second base station. For example, the electronic device 101 may be connected to the first base station by performing a random access channel (RACH) with the first base station (e.g., the electronic device 101 may be in the RRC connected state for the first base station). After connected with the first base station, the electronic device 101 may perform connection reconfiguration for measuring the secondary cell group (SCG) with the first base station and report measurement information (e.g., at least one of the reference signal received power (RSRP), reference signal received quality (RSRQ), and signal-to-interference plus noise ratio (SINR)) corresponding to the second base station to the first base station. The electronic device 101 (e.g., the first communication processor 212) may perform RRC connection reconfiguration of an SCG add setting (e.g., second base station add setting) with the first base station after the second base station (e.g., secondary node) is selected by the first base station. The electronic device 101 (e.g., the second communication processor 214) may perform a synchronization signal block (SSB) sync. After performing the SSB sync, the electronic device 101 may perform an RACH procedure with the second base station, thereby connecting to the second base station (e.g., the electronic device 101 may become the RRC connected state for the second base station).

In an embodiment, the electronic device 101 may be connected with the first base station and the second base station based on frequency bands combinable in ENDC. For example, the electronic device 101 may become the LTE RRC connected state using a first channel (e.g., the low channel of the LTE B2 band) of the first frequency band of LTE communication (hereinafter, denoted as a 'first frequency band') for the first base station and then receive the control message UE CAPABILITY ENQUIRY from the first base station. Upon receiving the control message, the electronic device 101 may transmit (or report) information about the frequency bands combinable in ENDC (e.g., the second frequency band (hereinafter, denoted as 'second frequency band') of NR communication combinable with the first frequency band (e.g., the first channel of the first frequency band)) (e.g., information about the second channel of the second frequency band) to the first base station. The electronic device 101 may be connected to the second base station by performing an RACH procedure with the second base station using the second frequency band of NR communication (e.g., the second channel of the second frequency band) combinable with the first frequency band (e.g., the first channel of the first frequency band).

In operation 703, in an embodiment, upon identifying that the electronic device 101 is in the first state, the processor may identify the information about allocation of a resource for the communication signal to be transmitted using the second frequency band of the second network communication (e.g., NR communication).

In an embodiment, the processor 120 may transmit a request for uplink to the second base station in the first state of the electronic device 101. The processor 120 may receive downlink control information (DCI) for the uplink grant including the information about allocation of the resource for the communication signal to be transmitted using the second frequency band of NR communication from the second base station. For example, the processor 120 may receive the information about allocation of the resource block for the communication signal to be transmitted using the second frequency band of NR communication from the second base station. The processor 120 may identify the received information about allocation of the resource block.

In an embodiment, the information about allocation of the resource block for the communication signal to be transmitted using the second frequency band of NR communication from the second base station may include information related to the bandwidth where the electronic device 101 has transmitted the communication signal to the second base station.

In operation 705, in an embodiment, upon identifying that the information about allocation of the resource for the communication signal to be transmitted using the second frequency band of the second network communication (e.g., NR communication), the processor 120 may control the switching operation of the aperture switch 530 based on the antenna setting corresponding to the channel of the second frequency band of NR communication among the plurality of antenna settings stored in the memory 130.

Hereinafter, a method for controlling the aperture switch 530 based on the plurality of antenna settings (e.g., setting values) stored in the memory 130 by the processor 120 is described below in detail with reference to FIG. 8 depicting view (800).

Referring to FIG. 8, in an embodiment, the antenna settings A(811), B(812), and C(813) may be antenna settings for controlling the switching operation of the aperture switch 530 when the electronic device 101 is connected with the LTE base station in a stand alone (SA) manner (or when in the RRC connected state for the LTE base station and not in the RRC connected state for the NR base station). For example, antenna setting A(811) may be an antenna setting for controlling the switching operation of the aperture switch 530 to impedance-match the antenna on the low channel of the LTE B2 band (e.g., the second antenna 520 transmitting or receiving the communication signal of the frequency band within the second frequency band range) when the electronic device 101 is connected with the LTE base station using the low channel of the LTE B2 band (e.g., the LTE B2 band within the second frequency band range) in the SA manner. Antenna setting B(812) may be an antenna setting for controlling the switching operation of the aperture switch 530 to impedance-match the antenna on the mid channel of the LTE B2 band when the electronic device 101 is connected with the LTE base station using the mid (middle) channel of the LTE B2 band. Antenna setting C(813) may be an antenna setting for controlling the switching operation of the aperture switch 530 to impedance-match the antenna on the high channel of the LTE B2 band when the electronic device 101 is connected with the LTE base station using the high channel of the LTE B2 band.

In an embodiment, the antenna settings A(811), B(812), and C(813) may be set to at least partially differ.

Referring to FIG. 8, in an embodiment, the antenna settings D(814), E(815), and F(816) may be antenna settings for controlling the switching operation of the aperture switch 530 when the electronic device 101 is connected with the NR base station in a stand alone (SA) manner. For example, antenna setting D(814) may be an antenna setting for controlling the switching operation of the aperture switch 530 to impedance-match the antenna on the low channel of the NR N41 band (e.g., the second antenna 520 transmitting or receiving the communication signal of the frequency band within the second frequency band range) when the electronic device 101 is connected with the NR base station using the low channel of the NR N41 band (e.g., the NR N41 band within the second frequency band range) in the SA manner Antenna setting E(815) may be an antenna setting for controlling the switching operation of the aperture switch 530 to impedance-match the antenna on the mid channel of the NR N41 band when the electronic device 101 is connected with the NR base station using the mid channel of the NR N41 band. Antenna setting F(816) may be an antenna setting for controlling the switching operation of the aperture switch 530 to impedance-match the antenna on the high channel of the NR N41 band when the electronic device 101 is connected with the NR base station using the high channel of the NR N41 band.

In an embodiment, the antenna settings D(814), E(815), and F(816) may be set to at least partially differ.

Referring to FIG. 8, in an embodiment, the antenna settings G(817), H(818), and I(819) may be antenna settings for controlling the switching operation of the aperture switch 530 when the electronic device 101 is connected with the LTE base station and NR base station in ENDC (e.g., when in the RRC connected state for the LTE base station and in the RRC connected state for the NR base station). For example, antenna setting G(817) may be an antenna setting that may be made for the electronic device 101 to adjust the impedance of the antenna (e.g., the second antenna 520 transmitting or receiving the communication signal of the frequency band within the second frequency band range) (e.g., to control the switching operation of the aperture switch 530) when the channel of at least one of the B2 band and the N41 band combinable with the B2 band is the low channel. Antenna setting H(818) may be an antenna setting that may be made for the electronic device 101 to adjust the impedance of the antenna when the channel of at least one of the B2 band and the N41 band is the mid channel Antenna setting I(819) may be an antenna setting that may be made for the electronic device 101 to adjust the impedance of the antenna when the channel of at least one of the B2 band and the N41 band is the high channel.

In an embodiment, upon identifying that the information about allocation of the resource for the communication signal to be transmitted using the second frequency band of the second network communication (e.g., NR communication), the processor 120 may control the switching operation of the aperture switch 530 based on the antenna setting corresponding to the channel of the second frequency band of NR communication among the plurality of antenna settings (e.g., settings A(811) to I(819)) stored in the memory 130. For example, upon identifying information about allocation of the resource for the communication signal to be transmitted using the low channel of the N41 band of NR communication, the processor 120 may identify the antenna setting G(817) corresponding to the low channel of the N41 band among the antenna settings (e.g., settings A(811) to I(819)). The processor 120 may control the switching operation of the aperture switch 530 so that the state of the aperture switch 530 (e.g., the switching state of the aperture switch 530) is the state (e.g., the on/off states of the first switch 610 to fourth switch 640) of the aperture switch 530 corresponding to setting G(817). As another example, upon identifying information about allocation of the resource for the communication signal to be transmitted using the mid channel of the N41 band of NR communication, the processor 120 may identify the antenna setting H(818) corresponding to the mid channel of the N41 band among the antenna settings (e.g., settings A(811) to I(819)). The processor 120 may control the switching operation of the aperture switch 530 so that the state of the aperture switch 530 is the state of the aperture switch 530 corresponding to antenna setting H(818). As another example, upon identifying information about allocation of the resource for the communication signal to be transmitted using the high channel of the N41 band of NR communication, the processor 120 may identify the antenna setting I(819) corresponding to the high channel of the N41 band among the antenna settings (e.g., settings A(811) to I(819)). The processor 120 may control the switching operation of the aperture switch 530 so that the state of the aperture switch 530 is the state of the aperture switch 530 corresponding to setting I(819).

In an embodiment, upon failing to identify the information about allocation of the resource for the communication signal to be transmitted using the second frequency band of the second network communication (e.g., NR communication) (or upon failing to receive information about resource allocation for the communication signal to be transmitted from the second base station) while the electronic device 101 is connected with the first base station and second base station, the processor 120 may control the switching operation of the aperture switch 530 based on the antenna setting corresponding to the channel of the frequency band of LTE communication which is the anchor band, among the plurality of antenna settings stored in the memory 130. For example, upon failing to identify the information about allocation of the resource for the communication signal to be transmitted using the channel of the N41 band of NR communication while the electronic device 101 is connected with the first base station using the low channel of the B2 band and connected with the second base station using one channel of the low channel to high channel of the N41 band, the processor 120 may identify the antenna setting G(817) corresponding to the low channel (e.g., the low channel of the B2 band as the anchor band without considering the channel of the N41 band) of the B2 band as the anchor band among the antenna settings (e.g., settings A(811) to I(819)). The processor 120 may control the switching operation of the aperture switch 530 so that the state of the aperture switch 530 (e.g., the switching state of the aperture switch 530) is the state (e.g., the on/off states of the first switch 610 to fourth switch 640) of the aperture switch 530 corresponding to the setting G(817). As another example, upon failing to identify the information about allocation of the resource for the communication signal to be transmitted using the channel of the N41 band of NR communication while the electronic device 101 is connected with the first base station using the mid channel of the B2 band and connected with the second base station using one channel of the low channel to high channel of the N41 band, the processor 120 may identify the antenna setting H(818) corresponding to the mid channel of the B2 band as the anchor band among the antenna settings (e.g., settings A(811) to I(819)). The processor 120 may control the switching operation of the aperture switch 530 so that the state of the aperture switch 530 (e.g., the switching state of the aperture switch 530) is the state of the aperture switch 530 corresponding to setting H(818) (e.g., the on/off states of the first switch 610 to fourth switch 640). As another example, upon failing to identify the information about allocation of the resource for the communication signal to be transmitted using the channel of the N41 band of NR communication while the electronic device 101 is connected with the first base station using the high channel of the B2 band and connected with the second base station using one channel of the low channel to high channel of the N41 band, the processor 120 may identify the antenna setting H(819) corresponding to the high channel of the B2 band as the anchor band among the antenna settings (e.g., settings A(811) to I(819)). The processor 120 may control the switching operation of the aperture switch 530 so that the state of the aperture switch 530 (e.g., the switching state of the aperture switch 530) is the state of the aperture switch 530 corresponding to setting I(819) (e.g., the on/off states of the first switch 610 to fourth switch 640).

In an embodiment, upon failing to identify the information about allocation of the resource for the communication signal to be transmitted using the second frequency band of the second network communication (e.g., NR communication) (e.g., upon failing to receive information about resource allocation for the communication signal to be transmitted from the second base station) while the electronic device 101 is connected with the first base station and second base station, the processor 120 may control the switching operation of the aperture switch 530 based on the antenna setting corresponding to the channel of the frequency band within the first frequency band range when there is a frequency band within the first frequency band range (e.g., a frequency band range including a frequency band lower than 1 GHz as a designated frequency) of the LTE band and the NR band. For example, the electronic device 101 may be connected with the first base station using the B3 band of LTE communication which is not within the first frequency band range (e.g., within the second frequency band range (e.g., the frequency band range including the frequency band not lower than 1 GHz as the designated frequency)) and connected with the second base station using the N7 band of NR communication within the first frequency band range and combinable with the B3 band. The processor 120 may control the switching operation of the aperture switch 530 based on the antenna setting corresponding to the channel of the N7 band within the first frequency band range, not the B3 band which is not within the first frequency band range as the anchor band.

In an embodiment, upon identifying information about allocation of the resource for the communication signal to be transmitted using the second frequency band of the second network communication (e.g., NR communication) while the electronic device 101 is connected with the first base station and the second base station using the frequency bands (e.g., bands within the second frequency band range) which are not within the first frequency band range (e.g., while the electronic device 101 is connected with the first base station using the B2 band of LTE communication and connected with the second base station using the N41 band of NR communication), the processor 120 may control the switching operation of the aperture switch 530 based on the antenna setting corresponding to the channel of the frequency band of LTE communication which is the anchor band among the plurality of antenna settings stored in the memory 130.

Although not shown in FIG. 7, the processor 120 may control the switching operation of the aperture switch 530 and then transmit the communication signal using the channel of the second frequency band of the second network communication (e.g., NR communication) through the antenna (e.g., the first antenna 510 or the second antenna 520).

In an embodiment, upon transmitting the communication signal using the frequency band of NR communication through the antenna (e.g., the first antenna 510 or the second antenna 520) in ENDC, the electronic device 101 may enhance the performance of the antenna by controlling the switching operation of the aperture switch 530 based on the channel of the frequency band of NR communication.

In an embodiment, the electronic device 101 may configure antenna settings for all of combinations of the channels (low channel, mid channel, and high channel) of the frequency band of LTE communication in ENDC and channels (low channel, mid channel, and high channel) of the frequency band of NR communication and may configure only antenna settings corresponding to the low channel, mid channel, and high channel in a combination of the frequency band of LTE communication and the frequency band of NR communication.

In an embodiment, the electronic device 101 may reduce degradation of antenna performance (or prevent degradation of antenna performance) by adjusting (or matching) the impedance of the antenna (e.g., at least one of the first antenna 510 or the second antenna 520) using an aperture tuning circuit including the aperture switch 530, without using an impedance tuning circuit.

Figure 9:
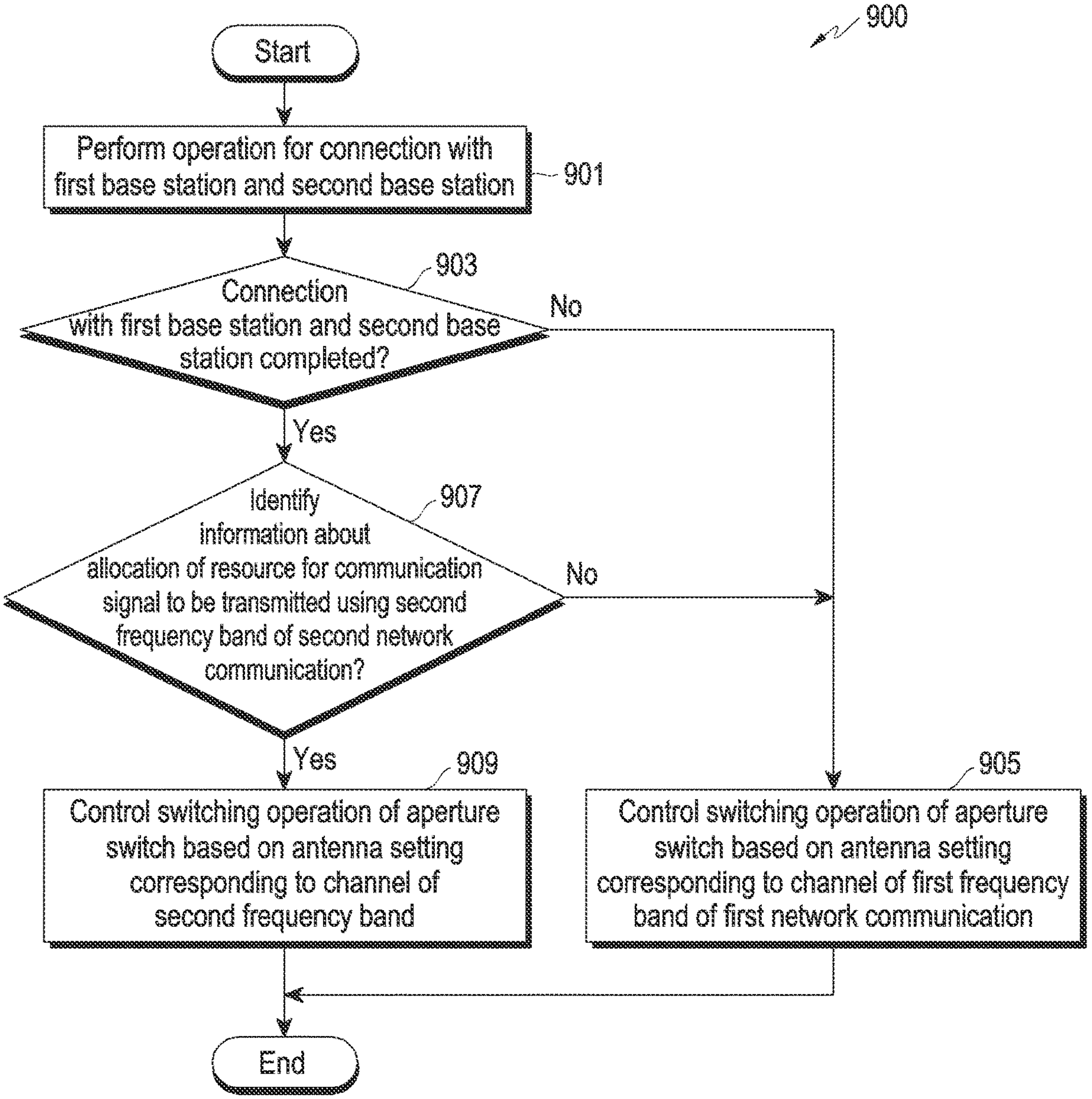
FIG. 9 is a flowchart illustrating a method for controlling an aperture switch in ENDC according to an embodiment of the disclosure.

FIG. 9 is a flowchart illustrating a method for controlling an aperture switch in ENDC according to an embodiment of the disclosure.

Referring to FIG. 9 depicting flowchart 900, in operation 901, in an embodiment, the processor 120 may perform an operation for the electronic device 101 to connect with a first base station corresponding to first network communication and operated as a master node and a second base station corresponding to second network communication and operated as a secondary node.

In an embodiment, the processor 120 may perform an operation for the electronic device 101 to connect to the first base station (e.g., an operation for the electronic device 101 to become the RRC connected state for the first base station) by an RACH procedure with the first base station.

In an embodiment, after the electronic device 101 is connected with the first base station, the processor 120 may perform connection reconfiguration for measuring the secondary cell group (SCG) with the first base station and report measurement information (e.g., at least one of the reference signal received power (RSRP), reference signal received quality (RSRQ), and signal-to-interference plus noise ratio (SINR)) corresponding to the second base station to the first base station. The processor 120 may perform an RRC connection reconfiguration of an SCG add setting with the first base station after the second base station is selected by the first base station. The processor 120 may allow the electronic device 101 to perform an SSB sync. The processor 120 may perform an operation for the electronic device 101 to connect to the second base station (an operation for the electronic device 101 to become the RRC connected state for the second base station) by performing an RACH procedure with the second base station after the electronic device 101 performs an SSB sync.

If the operation for the electronic device 101 to connect with the first base station and second base station is not completed in operation 903, in an embodiment, the processor 120 may control the switching operation of the aperture switch 530 based on the antenna setting corresponding to the channel of the first frequency band of the first network communication (e.g., LTE communication) in operation 905.

For example, when the electronic device 101 is connected with the first base station using one channel of the low channel, mid channel, or high channel of the B2 band of LTE communication in the SA manner, the processor 120 may identify the antenna setting corresponding to one channel among the antenna settings D(814), E(815), and F(816) of the B2 band. The processor 120 may control the switching operation of the aperture switch 530 based on the identified antenna setting.

If the operation for the electronic device 101 to connect with the first base station and second base station is completed in operation 903, in an embodiment, the processor 120 may identify the information about allocation of the resource for the communication signal to be transmitted using the second frequency band of the second network communication (e.g., NR communication) in operation 907.

In an embodiment, the processor 120 may transmit a request for uplink to the second base station. The processor 120 may receive downlink control information (DCI) for the uplink grant including the information about allocation of the resource for the communication signal to be transmitted using the second frequency band of NR communication from the second base station. For example, the processor 120 may receive the information about allocation of the resource block for the communication signal to be transmitted using the second frequency band of NR communication from the second base station. The processor 120 may identify the received information about allocation of the resource block.

Upon identifying information about allocation of the resource for the communication signal to be transmitted using the second frequency band of second network communication (e.g., NR communication) in operation 907, in an embodiment, the processor 120 may control the switching operation of the aperture switch 530 based on the antenna setting corresponding to the channel of the second frequency band of NR communication among the plurality of antenna settings stored in the memory 130 in operation 909.

Since the embodiments of operation 909 are at least partially identical or similar to the embodiments of operation 705, no detailed description thereof is presented below.

Upon identifying information about allocation of the resource for the communication signal to be transmitted using the second frequency band of the second network communication (e.g., NR communication) in operation 907, in an embodiment, the processor 120 may control the switching operation of the aperture switch 530 based on the antenna setting corresponding to the channel of the first frequency band of the first network communication (e.g., LTE communication) in operation 905.

For example, upon failing to identify the information about allocation of the resource for the communication signal to be transmitted using the second frequency band of the second network communication (e.g., NR communication) (or upon failing to receive information about resource allocation for the communication signal to be transmitted from the second base station), the processor 120 may control the switching operation of the aperture switch 530 based on the antenna setting corresponding to the channel of the frequency band of LTE communication which is the anchor band, among the plurality of antenna settings stored in the memory 130.

Although not shown in FIG. 9, the processor 120 may control the switching operation of the aperture switch 530 and then transmit or receive the communication signal through the antenna (e.g., the first antenna 510 or second antenna 520).

Figure 10:
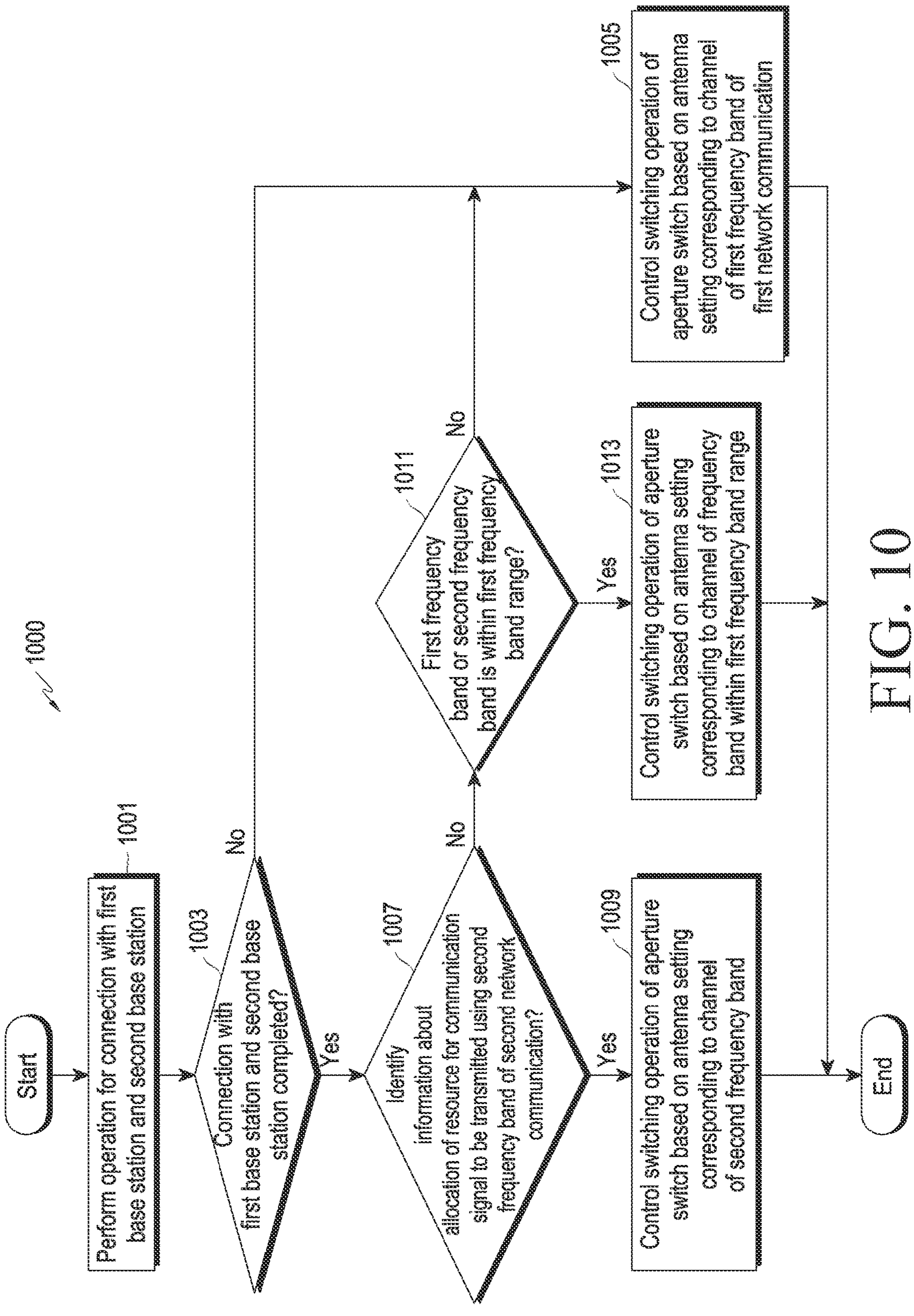
FIG. 10 is a flowchart illustrating a method for controlling an aperture switch in ENDC according to an embodiment of the disclosure.

FIG. 10 is a flowchart illustrating a method for controlling an aperture switch in ENDC according to an embodiment of the disclosure.

Referring to FIG. 10 depicting flowchart 1000, in operation 1001, in an embodiment, the processor 120 may perform an operation for the electronic device 101 to connect with a first base station corresponding to first network communication and operated as a master node and a second base station corresponding to second network communication and operated as a secondary node.

In an embodiment, the processor 120 may perform an operation for the electronic device 101 to connect to the first base station (e.g., an operation for the electronic device 101 to become the RRC connected state for the first base station) by an RACH procedure with the first base station.

If the operation for the electronic device 101 to connect with the first base station and second base station is not completed in operation 1003, in an embodiment, the processor 120 may control the switching operation of the aperture switch 530 based on the antenna setting corresponding to the channel of the first frequency band of the first network communication (e.g., LTE communication) in operation 1005.

For example, when the electronic device 101 is connected with the first base station using one channel of the low channel, mid channel, or high channel of the B2 band of LTE communication in the SA manner, the processor 120 may identify the antenna setting corresponding to one channel among the antenna settings D(814), E(815), and F(816) of the B2 band. The processor 120 may control the switching operation of the aperture switch 530 based on the identified antenna setting.

If the operation for the electronic device 101 to connect with the first base station and second base station is completed in operation 1003, in an embodiment, the processor 120 may identify the information about allocation of the resource for the communication signal to be transmitted using the second frequency band of the second network communication (e.g., NR communication) in operation 1007.

Upon identifying information about allocation of the resource for the communication signal to be transmitted using the second frequency band of second network communication (e.g., NR communication) in operation 1007, in an embodiment, the processor 120 may control the switching operation of the aperture switch 530 based on the antenna setting corresponding to the channel of the second frequency band of NR communication among the plurality of antenna settings stored in the memory 130 in operation 1009.

Since the embodiments of operations 1007 and 1009 are at least partially identical or similar to the embodiments of operations 907 and 909, no detailed description thereof is presented below.

Upon failing information about allocation of the resource for the communication signal to be transmitted using the second frequency band of the second network communication (e.g., NR communication) in operation 1007, in an embodiment, the processor 120 may identify whether there is a frequency band within the first frequency band range (e.g., a frequency band range including a frequency band lower than 1 GHz as a designated frequency) of the first frequency band (e.g., an LTE band) and the second frequency band (e.g., an NR band) in operation 1011.

In an embodiment, upon identifying that there is a frequency band within the first frequency band range of the first frequency band and the second frequency band in operation 1011, the processor 120 may control the switching operation of the aperture switch 530 based on the antenna setting corresponding to the channel of the frequency band within the first frequency band range. For example, the electronic device 101 may be connected with the first base station using the B3 band of LTE communication which is not within the first frequency band range (e.g., within the second frequency band range (e.g., the frequency band range including the frequency band not lower than 1 GHz as the designated frequency)) and connected with the second base station using the N7 band of NR communication within the first frequency band range and combinable with the B3 band. The processor 120 may control the switching operation of the aperture switch 530 based on the antenna setting corresponding to the channel of the N7 band within the first frequency band range, not the B3 band which is not within the first frequency band range as the anchor band.

Upon identifying that the first frequency band and the second frequency band are not within the first frequency band range in operation 1011, in an embodiment, the processor 120 may control the switching operation of the aperture switch 530 based on the antenna setting corresponding to the channel of the first frequency band of the first network communication (e.g., LTE communication) in operation 1005.

In an embodiment, the processor 120 may control the switching operation of the aperture switch 530 based on the antenna setting corresponding to the channel of the frequency band of LTE communication which is the anchor band among the plurality of antenna settings stored in the memory 130.

Although not shown in FIG. 10, the processor 120 may control the switching operation of the aperture switch 530 and then transmit or receive the communication signal through the antenna (e.g., the first antenna 510 or second antenna 520).

Referring to FIG. 10, like in the embodiments of operation 1013, it is possible to enhance antenna performance by controlling the switching operation of the aperture switch 530 based on the antenna setting corresponding to the frequency band within the first frequency band range, narrower in resonance range of antenna than the second frequency band range.

Figure 11:
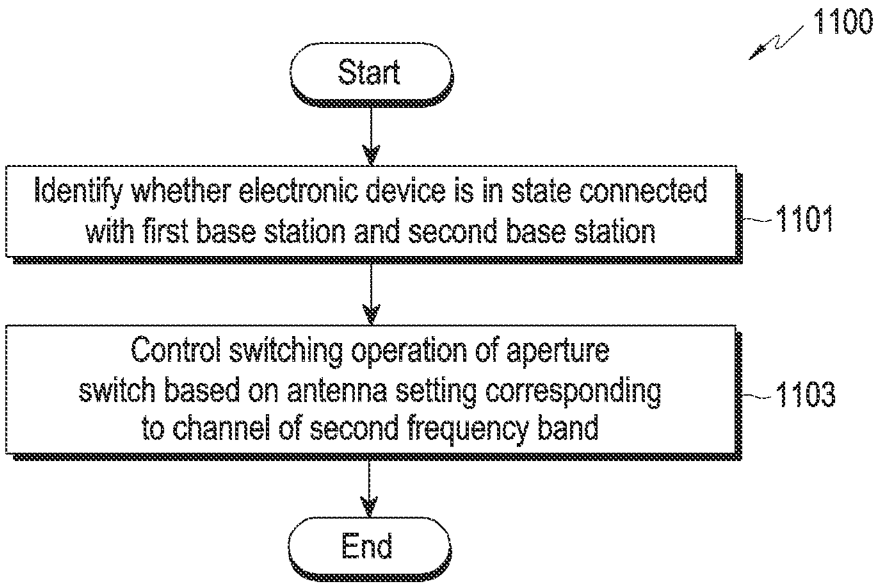
FIG. 11 is a flowchart illustrating a method for controlling an aperture switch in ENDC according to an embodiment of the disclosure.

FIG. 11 is a flowchart illustrating a method for controlling an aperture switch in ENDC according to an embodiment of the disclosure.

Referring to FIG. 11 depicting flowchart 1100, in operation 1101, in an embodiment, the processor 120 may identify whether the electronic device 101 is connected with a first base station corresponding to first network communication and operated as a master node and a second base station corresponding to second network communication and operated as a secondary node.

In an embodiment, the first state of the electronic device 101 may include an RRC connected state of the electronic device 101 for the first base station and an RRC connected state of the electronic device 101 for the second base station. After connected to the first base station, the electronic device 101 may be connected to the second base station through the above-described procedures (or operations) (e.g., the electronic device 101 may become the RRC connected state for the second base station).

In an embodiment, the electronic device 101 may be connected with the first base station and the second base station based on frequency bands combinable in ENDC. For example, the electronic device 101 may be connected with the first base station using the first channel of the first frequency band of LTE communication and connected with the second base station using the second channel of the second frequency band of NR communication.

In an embodiment, the first state of the electronic device 101 may include an RRC connected state of the electronic device 101 for the first base station and an RRC inactive state of the electronic device 101 for the second base station. For example, the state of the electronic device 101 may be switched from the RRC connected state for the second base station to the RRC inactive state for the second base station. The RRC inactive state for the second base station may be a state in which the RRC connection is not fully released when there is no traffic and, as necessary, may be switched to the RRC connected state.

In operation 1103, in an embodiment, the processor 120 may control the switching operation of the aperture switch 530 based on the antenna setting corresponding to the channel of the second frequency band of NR communication among the plurality of antenna settings stored in the memory 130.

When the electronic device 101 is in the RRC connected state for the first base station and in the RRC connected state or RRC inactive state for the second base station in a state in which no resource for the communication signal to be transmitted using the second frequency band of the second network communication (e.g., NR communication) is allocated, the processor 120 may control the switching operation of the aperture switch 530 based on the antenna setting corresponding to the channel of the second frequency band of NR communication.

Although not shown in FIG. 11, when the electronic device 101 does not complete the operation for connecting with the first base station and second base station, e.g., when the electronic device 101 is in the RRC connected state only for the first base station but is not connected with the second base station (e.g., when not in the RRC connected state and RRC inactive state for the second base station) or when the electronic device 101 is connected with the first base station in an SA manner, the processor 120 may control the switching operation of the aperture switch 530 based on the antenna setting corresponding to the channel of the first frequency band of first network communication (e.g., LTE communication).

Although not shown in FIG. 11, the processor 120 may control the switching operation of the aperture switch 530 and then transmit or receive the communication signal through the antenna (e.g., the first antenna 510 or second antenna 520).

According to various embodiments of the disclosure, a method for controlling an aperture switch 530 in E-UTRA new radio dual connectivity (ENDC) by an electronic device 101 may comprise identifying whether the electronic device 101 is in a state connected to a first base station corresponding to first network communication and operated as a master node and a second base station corresponding to second network communication and operated as a secondary node, upon identifying that the electronic device 101 is in the state, identifying information about allocation of a resource for a communication signal to be transmitted using a first frequency band of the second network communication, and upon identifying the information about allocation of the resource for the communication signal, controlling an switching operation of the aperture switch 530 included in the electronic device 101 based on an antenna setting corresponding to a channel of the first frequency band among a plurality of antenna settings stored in a memory of the electronic device 101.

According to various embodiments, the plurality of antenna settings may include antenna settings corresponding to a low channel, a mid channel, and a high channel of a combination of the first frequency band of the second network communication and the second frequency band of the first network communication. Controlling the switching operation of the aperture switch 530 may include, upon identifying the information about allocation of the resource for the communication signal, identifying an antenna setting corresponding to a channel of the first frequency band among the antenna settings and controlling the switching operation of the aperture switch 530 based on the antenna setting corresponding to the channel of the first frequency band among the antenna settings.

According to various embodiments, the method may further comprise, upon failing to identify the information about allocation of the resource for the communication signal, identifying an antenna setting corresponding to a channel of the second frequency band among the antenna settings and controlling the switching operation of the aperture switch 530 based on the antenna setting corresponding to the channel of the second frequency band among the antenna settings.

According to various embodiments, the plurality of antenna settings may include antenna settings corresponding to a low channel, a mid channel, and a high channel of the second frequency band of the first network communication. The method may further comprise identifying that the electronic device 101 is in a state connected to the first base station and not connected to the second base station, identifying an antenna setting corresponding to a channel of the second frequency band of the first network communication among the antenna settings, and controlling the switching operation of the aperture switch 530 based on the antenna setting corresponding to the channel of the second frequency band of the first network communication among the antenna settings.

According to various embodiments, the method may further comprise, upon failing to identify the information about allocation of the resource for the communication signal, identifying whether at least one band of the first frequency band of the second network communication or the second frequency band of the first network communication is within a first frequency band range including a frequency band lower than a designated frequency and, when the at least one band is within the first frequency band range, controlling the switching operation of the aperture switch 530 based on an antenna setting corresponding to a channel of the at least one band within the first frequency band range among the plurality of antenna settings.

According to various embodiments, the method may further comprise, when the first frequency band and the second frequency band are not within the first frequency band range, controlling the switching operation of the aperture switch 530 based on an antenna setting corresponding to a channel of the second frequency band of the first network communication among the plurality of antenna settings.

According to various embodiments, the information about allocation of the resource for the communication signal may include RB allocation information.

According to various embodiments, the electronic device 101 may include a first antenna 510 and a second antenna 520. The first antenna 510 may be an antenna for transmitting or receiving a communication signal using a first frequency band range including a frequency band lower than a designated frequency. The second antenna 520 may be an antenna for transmitting or receiving a communication signal using a second frequency band range including a frequency band not lower than the designated frequency. The first network communication may be LTE communication, and the second network communication may be NR communication.

Further, the structure of the data used in embodiments of the disclosure may be recorded in a computer-readable recording medium via various means. The computer-readable recording medium includes a storage medium, such as a magnetic storage medium (e.g., a read-only memory (ROM), a floppy disc, or a hard disc) or an optical reading medium (e.g., a compact disc read only memory (CD-ROM) or a digital versatile disc (DVD)).

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:

at least one processor configured to support long-term evolution (LTE) network communication and new radio (NR) network communication;

a plurality of antennas including a first antenna and a second antenna;

an aperture switch connected to the first antenna or the second antenna to change a resonance characteristic of at least one of the first antenna or the second antenna; and memory storing instructions and configured to store a plurality of antenna settings for controlling a switching operation of the aperture switch, wherein the instructions, when executed by the at least one processor individually or collectively, cause the electronic device to:

identify whether the electronic device is in a state connected to a first base station corresponding to the LTE network communication and operated as a master node and a second base station corresponding to the NR network communication and operated as a secondary node, based on the electronic device being in the state connected to the first base station using a first channel included in a first frequency band of the LTE network communication and the second base station using a second channel included in a second frequency band of the NR network communication, identify whether information about allocation of a resource for a communication signal to be transmitted using the second channel included in the second frequency band of the NR network communication is received from the second base station, based on identifying that the information about the allocation of the resource for the communication signal is received from the second base station, identify a first antenna setting corresponding to the second channel included in the second frequency band and a combination of the first frequency band and the second frequency band among the plurality of antenna settings, and control, based on the identified first antenna setting, the switching operation of the aperture switch, and based on identifying that the information about the allocation of the resource for the communication signal is not received from the second base station, identify a second antenna setting corresponding to the first channel included in the first frequency band and the combination of the first frequency band and the second frequency band among the antenna settings, and control, based on the identified second antenna setting, the switching operation of the aperture switch.

2. The electronic device of claim 1, wherein the plurality of antenna settings include antenna settings respectively corresponding to a low channel, a mid (middle) channel, and a high channel of the combination of the second frequency band of the NR network communication and the first frequency band of the LTE network communication, and wherein the instructions, when executed by the at least one processor individually or collectively, cause the electronic device to:

based on identifying that the information about allocation of the resource for the communication signal is received from the second base station, identify, among the antenna settings, the first antenna setting corresponding to the second channel of the second frequency band among the low channel, the mid channel, and the high channel, and control the switching operation of the aperture switch based on the first antenna setting.

3. The electronic device of claim 2, wherein the instructions, when executed by the at least one processor individually or collectively, further cause the electronic device to:

based on identifying that the information about the allocation of the resource for the communication signal is not received from the second base station, identify, among the antenna settings, the second antenna setting corresponding to the first channel of the first frequency band of the LTE network communication among the low channel, the mid channel, and the high channel; and control the switching operation of the aperture switch based on the second antenna setting.

4. The electronic device of claim 1, wherein the plurality of antenna settings include antenna settings respectively corresponding to a low channel, a mid channel, and a high channel of the first frequency band of the LTE network communication, and wherein the instructions, when executed by the at least one processor individually or collectively, further cause the electronic device to:

upon identifying that the electronic device is in a state connected to the first base station and not connected to the second base station, identify an antenna setting corresponding to the first channel of the first frequency band of the LTE network communication among the antenna settings, and control the switching operation of the aperture switch based on the antenna setting corresponding to the first channel of the first frequency band of the LTE network communication among the antenna settings.

5. The electronic device of claim 1, wherein the instructions, when executed by the at least one processor individually or collectively, further cause the electronic device to:

based on identifying that the information about the allocation of the resource for the communication signal is not received from the second base station, identify whether at least one band of the second frequency band of the NR network communication or the first frequency band of the LTE network communication is within a first frequency band range including a frequency band lower than a designated frequency, and in response to the at least one band being within the first frequency band range, control the switching operation of the aperture switch based on an antenna setting corresponding to a channel of the at least one band within the first frequency band range among the plurality of antenna settings.

6. The electronic device of claim 5, wherein the instructions, when executed by the at least one processor individually or collectively, further cause the electronic device to:

in response to the first frequency band and the second frequency band not being within the first frequency band range, control the switching operation of the aperture switch based on an antenna setting corresponding to the first channel included in the first frequency band of the LTE network communication among the plurality of antenna settings.

7. The electronic device of claim 1, wherein the information about the allocation of the resource for the communication signal includes resource block (RB) allocation information.

8. The electronic device of claim 1, wherein the first antenna is an antenna for transmitting or receiving a communication signal using a first frequency band range including a frequency band lower than a designated frequency, wherein the second antenna is an antenna for transmitting or receiving a communication signal using a second frequency band range including a frequency band not lower than the designated frequency.

9. A method for controlling an aperture switch in evolved universal terrestrial radio access (E-UTRA) new radio dual connectivity (ENDC) by an electronic device, the method comprising:

identifying whether the electronic device is in a state connected to a first base station corresponding to long-term evolution (LTE) network communication and operated as a master node and a second base station corresponding to new radio (NR) network communication and operated as a secondary node;

based on the electronic device being in the state connected to the first base station using a first channel included in a first frequency band of the LTE network communication and the second base station using a second channel included in a second frequency band of the NR network communication, identify whether information about allocation of a resource for a communication signal to be transmitted using the second channel of the second frequency band of the NR network communication is received from the second base station;

based on identifying that the information about the allocation of the resource for the communication signal is received from the second base station, identifying a first antenna setting corresponding to the second channel included in the second frequency band and a combination of the first frequency band and the second frequency band among a plurality of antenna settings for controlling a switching operation of an aperture switch included in the electronic device and controlling, based on the identified first antenna setting, the switching operation of the aperture switch; and based on identifying that the information about the allocation of the resource for the communication signal is not received from the second base station, identify a second antenna setting corresponding to the first channel included in the first frequency band and the combination of the first frequency band and the second frequency band among the antenna settings, and controlling, based on the identified second antenna setting, the switching operation of the aperture switch.

10. The method of claim 9, wherein the plurality of antenna settings include antenna settings respectively corresponding to a low channel, a mid channel, and a high channel of the combination of the first frequency band of the NR network communication and the second frequency band of the LTE network communication, and wherein based on identifying that the information about the allocation of the resource for the communication signal is received from the second base station, the first antenna setting corresponding to the second channel of the second frequency band among the low channel, the mid channel, and the high channel is identified among the antenna settings, and the switching operation of the aperture switch is controlled based on the first antenna setting.

11. The method of claim 10, further comprising:

based on identifying that the information about the allocation of the resource for the communication signal is not received from the second base station, identifying, among the antenna settings, the second antenna setting corresponding to the first channel of the first frequency band among the low channel, the mid channel, and the high channel; and controlling the switching operation of the aperture switch based on the second antenna setting.

12. The method of claim 9, wherein the plurality of antenna settings include antenna settings respectively corresponding to a low channel, a mid channel, and a high channel of the first frequency band of the LTE network communication, and wherein the method further comprises:

identifying that the electronic device is in a state connected to the first base station and not connected to the second base station;

identifying an antenna setting corresponding to the first channel of the first frequency band of the LTE network communication among the antenna settings; and controlling the switching operation of the aperture switch based on the antenna setting corresponding to the first channel of the first frequency band of the LTE network communication among the antenna settings.

13. The method of claim 9, further comprising:

based on identifying that the information about the allocation of the resource for the communication signal is not received from the second base station, identifying whether at least one band of the second frequency band of the NR network communication or the first frequency band of the LTE network communication is within a first frequency band range including a frequency band lower than a designated frequency; and in response to the at least one band being within the first frequency band range, controlling the switching operation of the aperture switch based on an antenna setting corresponding to a channel of the at least one band within the first frequency band range among the plurality of antenna settings.

14. The method of claim 13, further comprising:

in response to the first frequency band and the second frequency band not being within the first frequency band range, controlling the switching operation of the aperture switch based on an antenna setting corresponding to the first channel of the first frequency band of the LTE network communication among the plurality of antenna settings.

15. The method of claim 9, wherein the information about the allocation of the resource for the communication signal includes resource block (RB) allocation information.

16. The method of claim 9, wherein the electronic device includes a plurality of antennas including a first antenna and a second antenna, wherein the first antenna is an antenna for transmitting or receiving a communication signal using a first frequency band range including a frequency band lower than a designated frequency, wherein the second antenna is an antenna for transmitting or receiving a communication signal using a second frequency band range including a frequency band not lower than the designated frequency.

17. An electronic device comprising:

at least one processor configured to support long-term evolution (LTE) network communication and new radio (NR) network communication;

a plurality of antennas including a first antenna and a second antenna;

an aperture switch connected to the first antenna or the second antenna to change at least one resonance characteristic of the first antenna or the second antenna; and memory storing instructions and configured to store a plurality of antenna settings for controlling a switching operation of the aperture switch, wherein the instructions, when executed by the at least one processor individually or collectively, cause the electronic device to:

identify whether the electronic device is in a state connected to a first base station corresponding to the LTE network communication and operated as a master node and a second base station corresponding to the NR network communication and operated as a secondary node, based on the electronic device being in the state connected to the first base station using a first channel included in a first frequency band of the LTE network communication and the second base station using a second channel included in a second frequency band of the NR network communication, identify whether information about allocation of a resource for a communication signal to be transmitted using the second channel included in the second frequency band of the NR network communication is received, based on identifying that the information about the allocation of the resource for the communication signal is received, identify a first antenna setting corresponding to the second channel included in the second frequency band and a combination of the first frequency band and the second frequency band, and control, based on the identified first antenna setting, the switching operation of the aperture switch, and based on identifying that the information about the allocation of the resource for the communication signal is not received, identify a second antenna setting corresponding to the first channel included in the first frequency band and the combination of the first frequency band and the second frequency band, and control, based on the identified second antenna setting, the switching operation of the aperture switch.

18. The electronic device of claim 17, wherein the state includes a long-term evolution (LTE) radio resource control (RRC) connected state for the first base station and an NR RRC connected state or an NR RRC inactive state for the second base station.

19. The electronic device of claim 17, wherein the plurality of antenna settings include antenna settings corresponding to a low channel, a mid (middle) channel, and a high channel of the combination of the second frequency band of the NR network communication and the first frequency band of the LTE network communication, wherein the instructions, when executed by the at least one processor individually or collectively, cause the electronic device to:

identify the antenna setting corresponding to the second channel of the second frequency band among the antenna settings, and control the switching operation of the aperture switch based on the antenna setting corresponding to the second channel of the second frequency band among the antenna settings.

20. The electronic device of claim 17, wherein the plurality of antenna settings include antenna settings corresponding to a low channel, a mid channel, and a high channel of the first frequency band of the LTE network communication, wherein the instructions, when executed by the at least one processor individually or collectively, further cause the electronic device to:

based on identifying that the electronic device is in a state connected to the first base station and not connected to the second base station, identify an antenna setting corresponding to the first channel of the first frequency band of the LTE network communication among the antenna settings, and control the switching operation of the aperture switch based on the antenna setting corresponding to the first channel of the first frequency band of the LTE network communication among the antenna settings.

* * * * *